US012798999B2

(12) United States Patent
Balakrishnan

(10) Patent No.: US 12,798,999 B2
(45) Date of Patent: Nov. 17, 2026

(54) SOLAR STILL SYSTEM

(71) Applicant: Prince Mohammad Bin Fahd University, Dhahran (SA)

(72) Inventor: Deepanraj Balakrishnan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 180 days.

(21) Appl. No.: 18/913,367

(22) Filed: Oct. 11, 2024

(65) Prior Publication Data

US 2026/0103403 A1 Apr. 16, 2026

(51) Int. Cl.

| | |
|---|---|
| ***C02F 1/14*** | (2023.01) |
| ***B01D 1/00*** | (2006.01) |
| ***B01D 1/22*** | (2006.01) |
| *C02F 1/04* | (2023.01) |
| *C02F 103/08* | (2006.01) |

(52) U.S. Cl.

CPC .............. *C02F 1/14* (2013.01); *B01D 1/0035* (2013.01); *B01D 1/22* (2013.01); *C02F 1/04* (2013.01); *C02F 2103/08* (2013.01); *C02F 2201/009* (2013.01)

(58) Field of Classification Search

CPC . C02F 1/04; C02F 1/14; B01D 1/0035; B01D 1/22

See application file for complete search history.

(56) References Cited

U.S. PATENT DOCUMENTS

| | | | | |
|---|---|---|---|---|
| 4,135,985 A * | 1/1979 | La Rocca | ............ | B01D 5/0066 203/DIG. 1 |
| 4,270,981 A * | 6/1981 | Stark | ......................... | C02F 1/14 202/180 |

(Continued)

FOREIGN PATENT DOCUMENTS

| | | |
|---|---|---|
| IN | 356589 B | 1/2021 |
| IN | 202241021821 A | 5/2022 |
| IN | 433401 B | 6/2023 |

OTHER PUBLICATIONS

Akkala et al "Impact of different fins designs on performance of solar still: a Review", Environment Development and Sustainability, Jun. 18, 2023. (Year: 2023).*

(Continued)

*Primary Examiner* — Jonathan Miller
(74) *Attorney, Agent, or Firm* — Oblon, McClelland, Maier & Neustadt, L.L.P.

(57) ABSTRACT

A solar still system including a storage tank, a piping network, a vessel, and a basin having an open top and at least five fins extending vertically from a bottom surface of the basin is described. The basin is disposed in an insulated enclosure with a fiber insulator filling a space between the basin and the insulated enclosure. The insulated enclosure has a top surface with a transparent cover. A collection tray is attached to an inner face of a first side of the insulated enclosure under the transparent cover, a glass stopper is attached to the transparent cover over the collection tray. The vessel has an open top including a lower convective zone, a non-convective zone, and an upper convective zone and includes at least four fins. A method of desalination using the solar still system is also described.

19 Claims, 18 Drawing Sheets

(56) References Cited

U.S. PATENT DOCUMENTS

| | | | | | |
|---|---|---|---|---|---|
| 4,326,498 | A * | 4/1982 | Eckland | F24S 10/13 126/567 |
| 4,363,703 | A * | 12/1982 | ElDifrawi | C02F 1/14 202/180 |
| 4,383,891 | A * | 5/1983 | Clavier | F24S 23/00 203/DIG. 1 |
| 4,487,659 | A * | 12/1984 | Stark | C02F 1/14 202/202 |
| 7,153,395 | B2 * | 12/2006 | Foster | C02F 1/14 203/DIG. 1 |
| 9,908,790 | B2 * | 3/2018 | Maiti | B01D 1/0035 |
| 10,183,233 | B1 * | 1/2019 | Haidar | B01D 3/008 |
| 11,261,103 | B2 * | 3/2022 | Macfarlane | B01D 1/16 |
| 12,091,329 | B1 * | 9/2024 | Abdullah Abdo | B01D 5/006 |
| 2014/0124356 | A1 * | 5/2014 | Mueller | C02F 1/14 126/714 |
| 2015/0107983 | A1 * | 4/2015 | Maiti | B01D 1/0082 202/234 |
| 2017/0166455 | A1 * | 6/2017 | Walker | B01D 3/007 |

OTHER PUBLICATIONS

Siva Ram Akkala, et al., "Impact of Different Fins Designs on Performance of Solar Still Desalination System: a Review", Environment Development and Sustainability, Jun. 18, 2023.

S. Joe Patrick Gnanaraj, et al., "A Review of Various Techniques Used for the Improvement of Solar Still", Research Journal of Pharmaceutical, Biological and Chemical Sciences, 8(3), May-Jun. 2017, pp. 1971-1979.

V. Velmurugan et al., "Single Basin Solar Still with Fin for Eenhancing Productivity", Energy Conversion and Management vol. 49, Issue 10, Jul. 16, 2018, pp. 2602-2608.

* cited by examiner

SOLAR STILL SYSTEM

STATEMENT REGARDING PRIOR DISCLOSURE BY THE INVENTORS

Aspects of the present disclosure are described in "Experimental and theoretical analysis of solar still with solar pond for enhancing the performance of sea water desalination" published in Volume 13, Water Reuse, which is incorporated herein by reference in its entirety.

BACKGROUND

Technical Field

The present disclosure is directed towards solar distillation systems, particularly directed towards an integrated single basin solar still with fins and finned vessel for enhanced thermal performance and efficiency of sea water desalination, and methods of desalinating salt containing aqueous compositions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

All living things need water. Human and animal life is not feasible without the availability of potable water. Oceans cover 71% of the planet's land area, and oceans and seas contain over 97% of the world's water resources, with much of it being saltwater. Fewer than 3% of all water supplies around the globe are considered freshwater. A bulk of the world's clean water is contained in ice in glaciers and icy surfaces. Fresh water in rivers and lakes make up about 0.3% of the total water supply around the world. Less than 1% of the clean surface water and the clean underground water on the earth is used by humans. The quantity of purified water needed to fulfill the expanding needs of business, agriculture, and the public is decreasing despite a growing worldwide population. Economic growth and quality of life are negatively affected when there is a deficiency of safe drinking water. Since brackish water cannot be utilized to produce drinks or other commodities due to the presence of dangerous bacteria and/or dissolved salts, many developing nations are in urgent need of clean, safe drinking water. Despite the fact that seawater is readily available, potable water cannot be found along various coastlines. Life-supporting systems need potable water. A lack of access to healthy water sources is a factor in the development of severe illness. Most of the two million individuals who die each year due to waterborne diseases are children, primarily in underdeveloped nations where cholera, diarrhea, typhoid, and malaria are the most common diseases.

For water purification, distillation is one of the methods available. For distillation, there must be a source of energy, such as heat and/or solar radiation. Pure water is formed when water vapor is isolated from dissolved materials and condensed after evaporation. Renewable energy may be an alternative for small, remote communities that do not have access to cheap fossil fuels to power desalination processes. Devices like solar stills can be used to distill seawater and brackish waters into clean and reusable liquids. Solar stills (SS) are commonly used in rural and isolated areas to provide modest amounts of potable water. Water scarcity is an issue throughout the world, but it is most noticed during summer seasons. Summer is a time when people use a lot of water, and the amount of sunlight absorbed by the earth's surface is at a high point. A variety of water desalination technologies have been developed; however, they all demand a large amount of electricity.

In contrast to other saltwater desalination methods, solar desalination is known for its cost-free energy, low operational expenses, and simple construction. In addition to treating brackish and contaminated water, solar desalination technology may be applied invariably. The fundamental mechanism involves evaporating water using solar heat, which then condenses as fresh water, leaving salts and other impurities behind. Typical solar still systems consist of a basin for holding water, a condensing cover, and may optionally include additional components such as solar collectors and/or reflective materials to enhance solar heat absorption. Despite its simplicity and sustainability, the efficiency of traditional solar still systems are often limited by several factors. One issue is inadequate transfer of heat within the system, which results in slow evaporation rates and, consequently, low daily output of distilled water. Additionally, heat losses due to inadequate insulation of the structure of the solar still can further reduce effectiveness of the system, particularly in less ideal climatic conditions.

Numerous solar still designs were tested to boost daily production. A corrugated sunlight still was created to increase the condensation rate of a solar still. Investigations on various solar still cover angles were carried out and a maximum efficiency obtained was 27.7% [Cardoso, M. K. B., da Silva, K. S., Silva, C. B., de Lima, G. G. C., de Medeiros, K. M. & de Lima, C. A. P. 2022 Low-cost solar still with corrugated absorber basin for water desalination. *Journal of the Brazilian Society of Mechanical Sciences and Engineering,* 44 (5), 214]. Both internal and external reflectors were used in a single basin solar still (SBSS), and the flat plate collection was found to be 51% more productive than a multiple slope solar still [Coelho, P. J. 2005 Fundamentals of a new method for the solution of the radiative transfer equation. *International Journal of Thermal Sciences,* 44 (9), 809-821]. A solar still using and electric blower with several wicks was 26% more efficient than standard solar stills [Kumar, R., Singh, D. B., Dewangan, A., Singh, V. K. & Kumar, N. 2021 Performance of evacuated tube solar collector integrated solar desalination unit-a review. *Desalination and Water Treatment,* 230, 92-115]. A pyramid-shaped solar still was found to be 45% more efficient than a standard SBSS. [El-Bahi, A. & Inan, D. 1999 Analysis of a parallel double glass solar still with separate condenser. *Renewable Energy,* 17 (4), 509-521].

A tube-SS with a tepid water flow over the distillate achieved a high productivity of 16 $kg \cdot m^{-2}$. A single basin was used to evaluate the outcome of water cooling the glass cover, and it was found that efficiency may still be boosted by up to 20% by appropriately configuring the film-cooling settings. A cooling water velocity of 1.5 $m \cdot s^{-1}$ was measured around the glass covering. Elements affecting the efficiency of solar evaporation were examined, and stepped solar productivity was still boosted by 125% by using inside and outside reflectors [Dehghan, A. A., Afshari, A. & Rahbar, N. 2015 Thermal modeling and exergetic analysis of a thermoelectric assisted solar still. *Solar Energy,* 115, 277-288].

One-dimensional thermal modelling of a glazing solar collector flat panel model utilized a fin-theory method in theoretical calculations. In theoretically modeling solar stills, calculations have focused on reducing the cost per unit of usable heat flow by adjusting the fin's width and thickness. For example, solar stills with fins constructed of old cotton rags that have been darkened produce a value of 7.5 $kg \cdot m^{-2}$.

Each of the aforementioned desalination strategies suffer from one or more drawbacks hindering their adoption, primarily that only a modest amount of distilled water can be generated each day by a basic solar still with a single basin. Accordingly, an object of the present disclosure to provide an integrated fin-type solar still with a finned pond for desalination that increases the efficiency and volume of distilled water production. The present integrated fin-type solar still with finned vessel combines several design enhancements to overcome the limitations of traditional solar stills, including increased heat absorption, prolonged heat retention, and accelerated evaporation rates.

SUMMARY

In an exemplary embodiment, a solar still system is described. The solar still system includes a storage tank, a piping network, and a basin. The basin has an open top, and the basin has at least five fins extending vertically from a bottom surface of the basin. The at least five fins are rectangular positioned parallel to one another and are 800 to 1000 mm in length, 30 to 40 mm in breadth, and 0.1 to 5 mm in thickness. The basin is disposed in an insulated enclosure, as such, a fiber insulator fills a space between the basin and the insulated enclosure. The insulated enclosure is a square with a first side having a first height and a second side having a second height and the first height is shorter compared to the second height. The insulated enclosure has a top surface with a transparent cover. The transparent cover is attached to a top of the first side and a top of the second side and the transparent cover is at an angle of 5 to 20°. A collection tray is attached to an inner face of the first side under the transparent cover, a glass stopper is attached to the transparent cover over the collection tray. The insulated enclosure is covered in one or more metal sheets. The solar still system further includes a vessel having an open top including a lower convective zone, a non-convective zone, and an upper convective zone. The vessel having an open top has a conical shape with a top surface and a bottom surface. The vessel having an open top has at least four fins extending vertically from the bottom surface of the vessel having an open top. The at least four fins are rectangular and are positioned parallel to one another and are 100 to 300 mm in length, 30 to 70 mm in breadth, and 0.1 to 5 mm in thickness. A surface area of the top surface of the vessel having an open top is greater than a surface area of the bottom surface of the vessel having an open top. The piping network fluidly connects, in the following order, the storage tank with the vessel having an open top and the vessel having an open top with the basin.

In some embodiments, the basin has a depth of 0.05 to 0.25 meters and a length of 0.5 to 2 meters.

In some embodiments, the basin is a galvanized iron material.

In some embodiments, the galvanized iron has a thickness of 1 to 5 mm.

In some embodiments, the at least five fins extending vertically from the bottom surface of the basin are positioned 0.1 to 0.2 m from each other.

In some embodiments, the fiber insulator is sawdust.

In some embodiments, the space between the basin and the insulated enclosure is 0.05 to 0.5 m thick.

In some embodiments, the transparent cover has a thickness of 1 to 10 mm.

In some embodiments, the at least four fins extending vertically from the bottom surface of the vessel having an open top are positioned 0.005 to 0.1 m from each other.

In some embodiments, the top surface of the vessel having an open top has a diameter of 0.6 to 1.2 m.

In some embodiments, the bottom surface of the vessel having an open top has a diameter of 0.1 to 0.5 m.

In some embodiments, the vessel having an open top has a height of 0.5 to 2.0 m.

In some embodiments, the lower convective zone has a greater salinity than the non-convective zone and the non-convective zone has a great salinity than the upper convective zone in the vessel having an open top.

In some embodiments, the piping network fluidly connects the upper convective zone of the vessel having an open top with the basin.

In some embodiments, the solar still system further includes a first flow control valve between the storage tank and the vessel having an open top, and a second flow control valve between the vessel having an open top and the basin.

In some embodiments, the solar still system further includes a collection tank, and the collection tray is fluidly connected to the collection tank by the piping network.

In another exemplary embodiment, a method of desalination is described. The method includes distilling water from an aqueous solution with the solar still system, the aqueous solution includes one or more salts. The distilling includes flowing the aqueous solution from the storage tank to the vessel having an open top and from the vessel having an open top to the basin. The method further includes exposing the aqueous solution in the basin to sunlight, evaporating water from the aqueous solution in the basin to form evaporated water, condensing the evaporated water on the transparent cover, and collecting condensed water in the collection tray.

In some embodiments, water obtained by the distilling from the solar still system is increased 50 to 55 percent by volume in comparison to the same solar still system in the absence of fins.

In some embodiments, the solar still system has a productivity rate of 2 liters per hour (L/h) to 4 L/h.

In some embodiments, the solar still system has a freshwater output 0.35 liters per square meter ($L/m^2$) to 0.45 $L/m^2$ at a solar intensity of 790 Watts per square meter ($W/m^2$) to 830 $W/m^2$.

These are other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
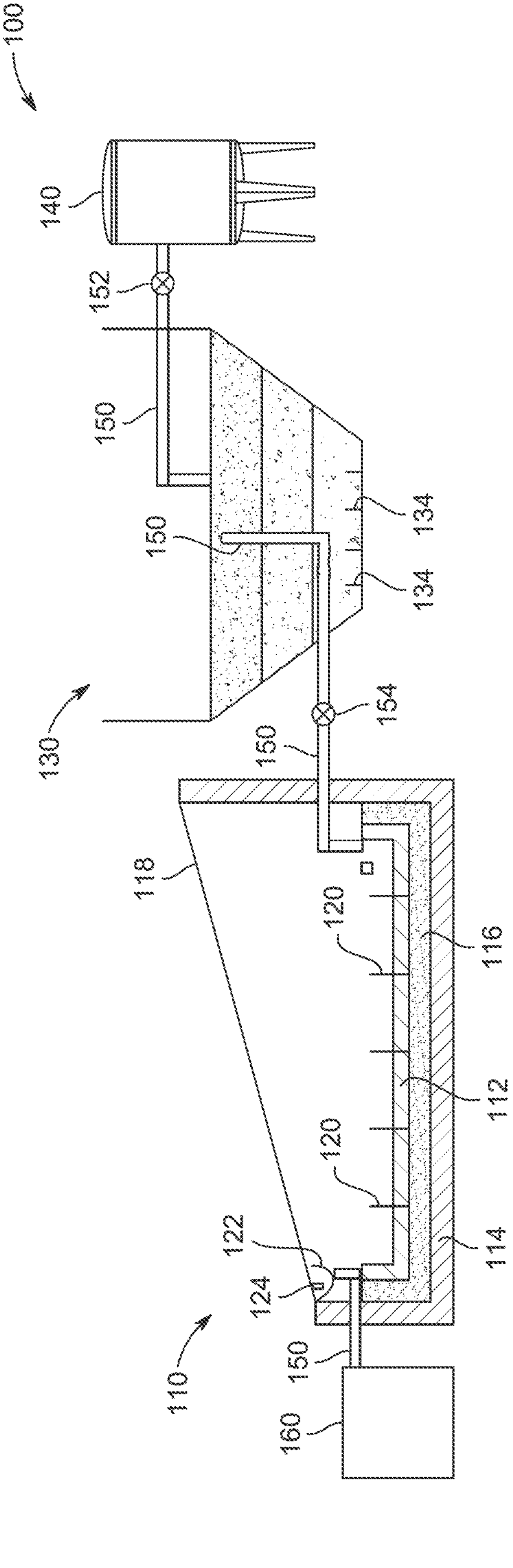
FIG. 1A is an exemplary diagram of a solar still system having a basin with fins combined with a vessel having an open top with fins and a storage tank, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or like reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system and a method of water desalination that address the inefficiency of solar stills through the introduction of fins in both a basin and a vessel (also referred to as a pond) having an open end. These fins increase the surface area for heat absorption and transfer, ensuring that more solar energy is converted into heat energy within water in the basin and the vessel. This not only speeds up the water heating process but also maintains a higher temperature in the basin over a longer period, which helps in consistent and efficient water evaporation.

Referring to FIG. 1A, illustrated is an exemplary diagram of a solar still system (as represented by reference numeral 100), as per embodiments of the present disclosure. The solar still system 100 represents a comprehensive approach to harnessing solar energy for the purpose of water distillation. The solar still system 100 utilizes advanced configurations and enhancements to improve the efficiency of the solar distillation process, utilizing the natural resources of sunlight and water without the need for external energy inputs. The solar still system 100 is designed to optimize the conversion of saline or brackish water into fresh water through an integrated set of components that function synergistically. The design ensures that maximum solar radiation is absorbed and converted into heat energy, which is then efficiently transferred throughout the system to heat and evaporate water. The resultant water vapor is then condensed into distilled water, which is collected for use.

Figure 1B:
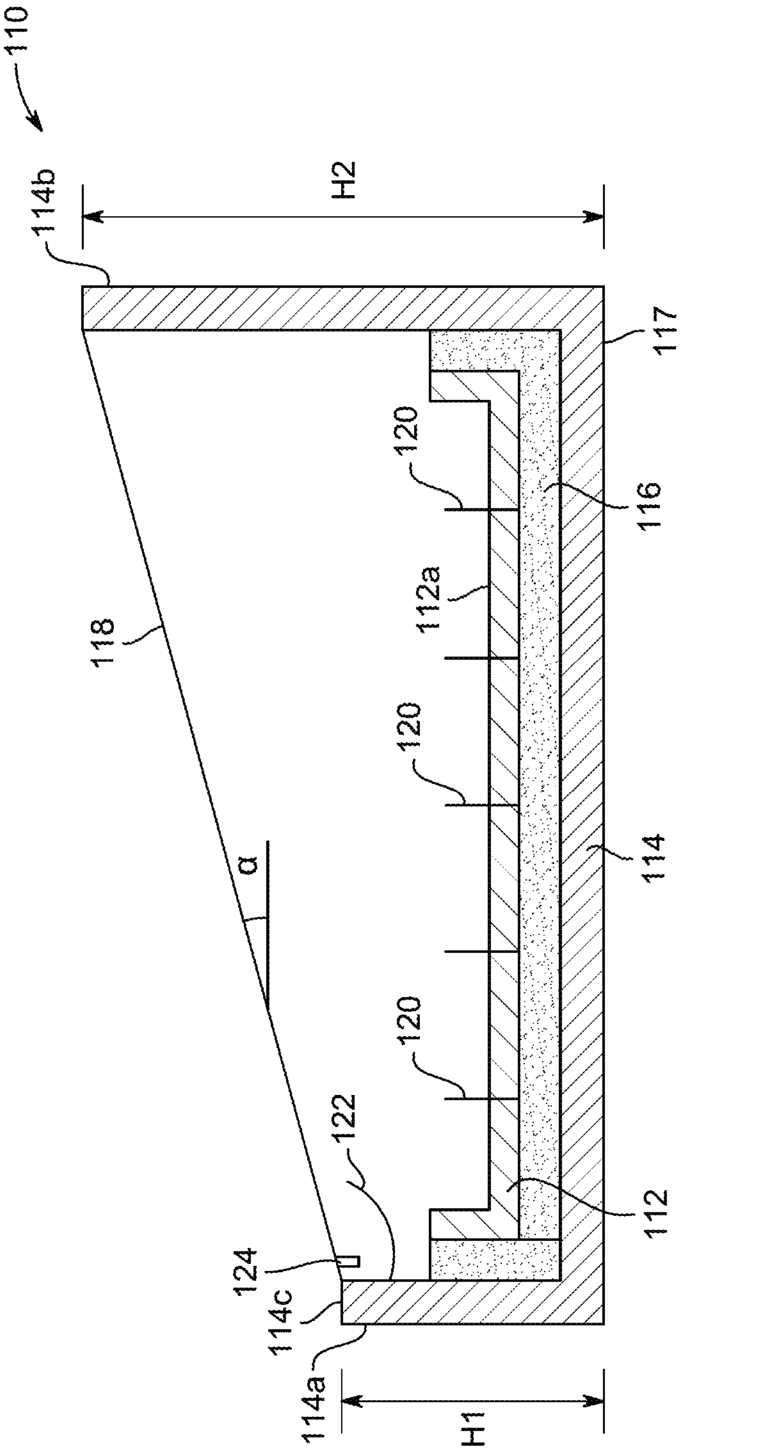
FIG. 1B is an exemplary diagram of the basin with fins of the solar still system, according to certain embodiments.

As illustrated, the solar still system 100 includes a solar still 110. FIG. 1B illustrates a detailed view of the solar still 110. As shown, in combination of FIGS. 1A-1B, the solar still 110 includes a basin 112. The basin 112 is characterized by having an open top. The open top design of the basin 112 facilitates the direct exposure of water within the basin 112 to sunlight, allowing for the efficient absorption of solar radiation necessary for the evaporation process. This specific feature of the basin 112 allows for maximizing the surface area through which solar energy can be absorbed and converted into heat, thereby enhancing the rate of evaporation of water contained within the basin 112. Additionally, the open top of the basin 112 allows for easy access for maintenance and cleaning purposes, which ensures continuous and efficient operation of the solar still system 100.

In an embodiment of the solar still system 100, the basin 112 has a depth (along a vertical direction) of 0.05 to 0.25 meters (m), preferably 0.08 to 0.2 m, more preferably 0.1 to 0.15 m, and yet more preferably about 0.12 m, and a length (along a horizontal direction) of 0.5 to 2 meters (m), preferably 0.7 to 1.5 m, more preferably 0.8 to 1.2 m, and yet more preferably about 1 m. This allows for maintaining a preferred volume of water for evaporation and providing a large surface area for solar radiation absorption and effective distribution of heat within the water. Further, the basin 112 is preferably a galvanized iron material. That is, the basin 112 may be constructed from galvanized steel or iron which provides durability and resistance to corrosion, as beneficial since the basin 112 is exposed to saline or brackish water and intense solar radiation. In other embodiments, the basin 112 is constructed from steel, copper, bronze, a combination thereof, and/or any other material known in the art. The thickness of the galvanized iron used in the basin 112 is between 1 to 5 mm, preferably 1.2 to 4 mm, preferably 1.5 to 3 mm, more preferably 1.7 to 2.5 mm, and yet more preferably about 2 mm. This thickness is selected to provide a balance between heat absorption efficiency and structural strength.

As better shown in FIG. 1B, the solar still 110 provides an arrangement wherein the basin 112 is disposed within an insulated enclosure 114. This configuration helps to maintain the thermal efficiency by reducing heat loss that could occur through the sides and/or bottom of the basin 112. In some embodiments, the insulated enclosure 114 is made of wood. In some embodiments, the insulated enclosure 114 is made of any insulating material known in the art. The insulated enclosure 114 is designed to retain the heat absorbed by the basin 112, thereby ensuring that the maximum amount of solar energy is utilized for the evaporation of water. Additionally, a fiber insulator (as represented by reference numeral 116) fills the space between the basin 112 and the insulated enclosure 114 on a bottom surface and on side surfaces. The purpose of the fiber insulator 116 is to provide an additional layer of thermal insulation, which further minimizes heat loss from the basin 112. In some embodiments, the insulated enclosure 114 is further covered in one or more metal sheets (generally represented by reference numeral 117). The metal sheets 117 may enhance the thermal efficiency of the solar still system 100 by serving as reflective surfaces that help to retain and redirect solar radiation back towards the basin 112. The metal sheets 117 also provides added durability and protection to the insulated enclosure 114. In some embodiments, the metal sheets 117 may be aluminum, copper, tin, iron, steel, a combination thereof, and any metal known in the art. In other embodiments, the metal sheets 117 may be comprised of a material other than metal, such as wood, plastic, and the like. In some embodiments, the metal sheets 117 may be on side surfaces of the insulated enclosure 114. In other embodiments, the metal sheets 117 may be on side surfaces and a bottom surface of the insulated enclosure 114. This design configuration of the solar still 110, utilizing the insulated enclosure 114 combined with the fiber insulator 116 and the metal sheets 117, maintains a higher temperature within the basin 112 for extended periods, thereby increasing the rate of evaporation and improving the productivity of the solar still system 100.

In an embodiment, the fiber insulator 116 is sawdust. Sawdust is chosen for its insulative properties, which help to minimize heat loss from the basin 112, thereby maintaining a higher temperature within the solar still system 100 for more effective evaporation. The use of sawdust as the fiber insulator 116 is also cost-effective and sustainable, making it an environmentally friendly option for enhancing the efficiency of the solar still system 100. In some embodiments, the fiber insulator 116 is paper, woodchips, straw, cotton, wool, hemp, and the like. In the present configuration, the space between the basin 112 and the insulated enclosure 114 is 0.05 to 0.5 m, preferably 0.06 to 0.4 m, preferably 0.07 to 0.3 m, preferably 0.08 to 0.2 m, more preferably 0.09 to 0.15 m, and yet more preferably about 0.1 m thick. Such space accommodates the fiber insulator 116 and promotes a sufficient volume to form a thermal barrier. This spacing promotes that the heat generated within the basin 112 is used efficiently for the evaporation of water, rather than being lost to the external environment.

In the solar still 110, the insulated enclosure 114, which houses the basin 112, preferably has a square base shape including a first side 114*a* and a second side 114*b* of different heights. Herein, the first side 114*a* of the insulated enclosure 114 has a first height "H1," and the second side 114*b* of the insulated enclosure 114 has a second height "H2," with the first height H1 of the first side 114*a* being shorter compared to the second height H2 of the second side 114*b*. The variance in height between the first side 114*a* and the second side 114*b* enhances the efficiency of the condensation process within the solar still 110. This configuration provides a sloped top, which results from the differing heights H1 and H2, and results in condensed moisture naturally gravitating towards the lower side, facilitating an easier and more efficient collection of distilled water.

Further, in the solar still 110, the insulated enclosure 114 includes a top surface 114*c*, which has a transparent cover 118, also referred to herein as a glass cover 118. In some embodiments, the glass cover 118 may be comprised of a transparent plastic and any other transparent material known in the art, for example polycarbonate, polyacrylic, polyester and the like. The glass cover 118 is preferably securely attached at the top of the first side 114*a* and the top of the second side 114*b* of the insulated enclosure 114. In an embodiment, a lower section of the transparent cover 118 is corrugated along a vertical direction going from the first side 114*a* towards the second side 114*b*. The lower section of the transparent cover 118 may take up or extend along a lower half, preferably a lower third, a lower quarter, a lower fifth, a lower sixth, and a lower eight of the transparent cover 118. The corrugation in the lower section of the transparent cover 118 is a wave-like pattern of angled sections made of valleys and ridges.

In some embodiments, the corrugation is a smooth, sinusoidal shape having an amplitude that decreases gradually to zero as the lower section transitions into a flat planar upper section of the transparent cover 118. In other embodiments, the corrugation represents flat angled surfaces forming peaks and valleys in the lower section. Triangular sections extending along the length of the lower section from an apex at a top portion of the lower section to an end of the transparent cover 118 at the second side 114*b* are arranged such that the triangular portions of the transparent cover 118 extend with one edge coplanar with the upper section of the transparent cover 118, and the other edge representing a series of valleys.

In an embodiment, the glass cover 118 has a thickness of 1 to 10 mm, preferably 2 to 8 mm, preferably 3 to 7 mm, more preferably 4 to 6 mm, and yet more preferably about 5 mm. The thickness provides an appropriate amount of strength and durability to withstand external environmental factors, such as wind and precipitation, while also being thin enough to allow for optimal heat transfer and light penetration to the basin 112. The design of the glass cover 118 is such that it is positioned at an angle "α" ranging from 5 to 20 degrees) (°), preferably 6 to 18°, preferably 7 to 16°, preferably 8 to 14°, more preferably 9 to 12°, and yet more preferably about 10°, creating a sloped structure that facilitates functioning of the solar still system 100. The angle α is determined from the top surface 114*c* of the insulated enclosure 114 and the glass cover 118. By sloping between the first side 114*a* and the second side 114*b*, the glass cover 118 allows condensed water vapor to naturally flow towards the lower side, following the gradient created by the angle α. In some embodiments, the glass cover 118 is attached to a third side of the insulated enclosure 114 (not shown) and a fourth side of the insulated enclosure 114 (not shown) to form a fully closed solar still 110. In some embodiments, the glass cover 118 is not attached to the third side of the insulated enclosure 114 nor the fourth side of the insulated enclosure 114 to form a space between the third side of the insulated enclosure 114 and the glass cover 118 and form a space between the fourth side of the insulated enclosure 114 and the glass cover 118. In some embodiments, the glass cover 118 may be attached to the third side of the insulated enclosure 114 or the fourth side of the insulated enclosure 114. In some embodiments, the glass cover 118 is not attached to the third side of the insulated enclosure 114 nor the fourth side of the insulated enclosure 114 and the glass cover has a lip to catch condensed water. This design promotes efficient collection of the distilled water as it drips down the underside of the glass cover 118, thereby maximizing water recovery and minimizing waste. Moreover, the angle α of the glass cover 118 may enhance the solar heat capture capabilities of the solar still system 100. The angled positioning may allow the glass cover 118 to catch more sunlight during different times of the day, heating the interior of the basin 112 more effectively. This increase in solar exposure may contribute to higher evaporation rates, which may increase the overall productivity of the solar still system 100.

Furthermore, in the solar still system 100, the basin 112 is designed to include at least five fins 120. This minimum of five fins 120, as incorporated in the basin 112 of the solar still 110, enhances the efficiency of the water heating process; however, it may be appreciated that, in alternate configurations, the number of fins 120 may be less (or more) without departing from the spirit and the scope of the present disclosure. In some embodiments, there may be 5 to 50 fins 120, preferably 10 to 40 fins 120, and preferably 20 to 30 fins 120 in the basin 112. In some embodiments, the fins 120 may be in a linear pattern down a center of the basin 112. In some embodiments, the fins 120 may be in a zig-zag pattern in the basin 112. In some embodiments, the fins 120 may be in any pattern known in the art. As shown in FIG. 1A and FIG. 1B, the fins 120 extend vertically from a bottom surface 112*a* of the basin 112. Each of the fins 120 is rectangular in shape and positioned parallel to one another, ensuring uniform distribution and maximization of the available surface area for heat absorption. In some embodiments, the fins 120 may have a cylindrical shape, a square shape, a pyramidal shape, and any shape known in the art. The dimensions of the fins 120 are tailored to optimize thermal performance. In an example configuration, each fin 120 is about 800 to 1000 millimeters (mm), preferably 820 to 980 mm, preferably 840 to 960 mm, preferably 860 to 940 mm, more preferably 880 to 920 mm, and yet more preferably about 900 mm in length (along vertical direction), which provides a large vertical area for heat capture and transfer. Each fin 120 is also about 30 to 40 mm, preferably 31 to 39 mm, preferably 32 to 38 mm, preferably 33 to 37 mm, more preferably 34 to 36 mm, and yet more preferably about 35 mm in breadth (along plane perpendicular to drawing), ensuring that they are sufficiently wide enough to conduct heat but spaced adequately to allow for the free circulation of water around the fins 120. Further, each fin 120 is 0.1 to 5 mm, preferably 0.5 to 4 mm, preferably 1 to 3 mm, more preferably 1.5 to 2.5 mm, and yet more preferably about 2 mm in thickness (along horizontal direction), which minimizes material use while also providing sufficient heat transfer. Furthermore, in an embodiment, the at least five fins 120 extending vertically from the bottom surface 112*a* of the basin 112 are positioned 0.1 to 0.2 m, preferably 0.12 to 0.19, preferably 0.14 to 0.18, more preferably 0.16 to 0.17 m, and yet more preferably about 0.165 m from each other (along horizontal direction). In some embodiments, the fins 120 may be in a square shape pattern, for example, a 5 by 5 formation of the fins 120 (25 total fins 120). This setup allows more solar energy to be converted into heat within the water, speeding up the evaporation process. The fins 120 also help to maintain a higher temperature within the basin 112 by distributing the heat evenly across the water, for consistent distillation performance.

Figure 1C:
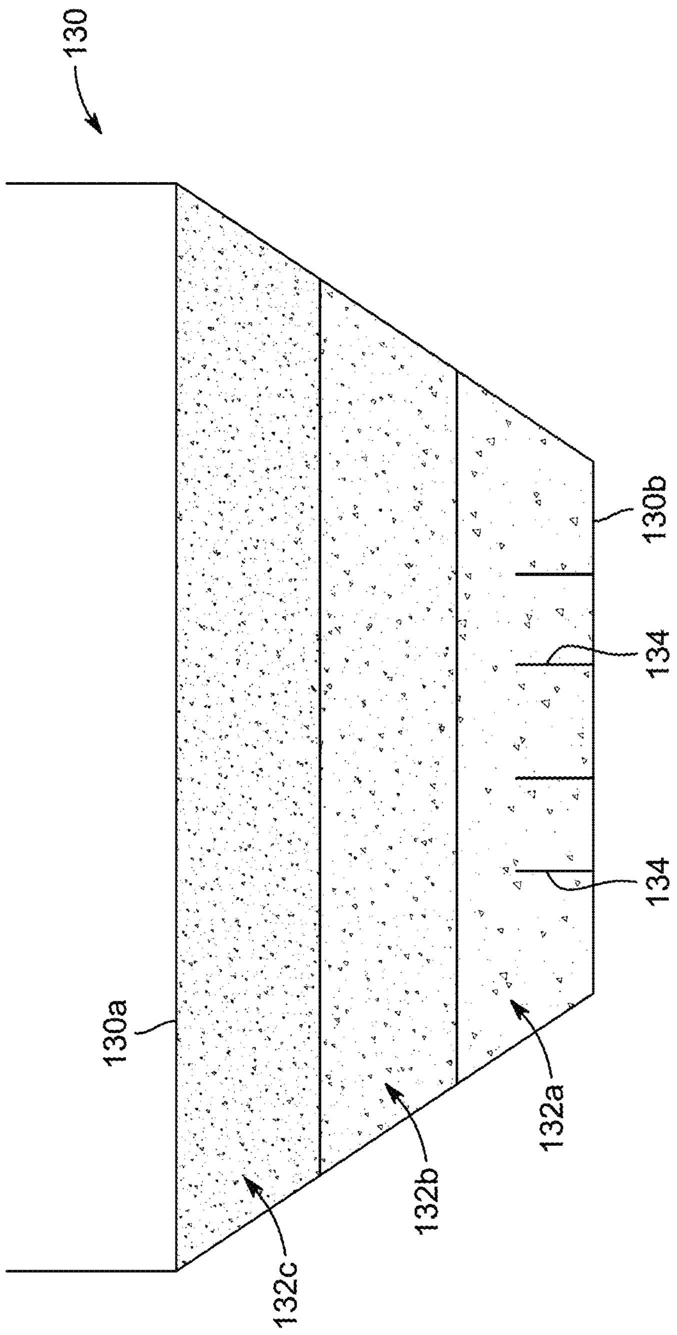
FIG. 1C is an exemplary diagram of the vessel having an open top with fins of the solar still system, according to certain embodiments.

Moreover, as illustrated in FIG. 1B, the solar still system 100 includes a collection tray 122 disposed in the solar still 110. The collection tray 122 is attached to an inner face of the first side 114*a*, positioned directly beneath the glass cover 118. This placement allows for capturing and collecting the condensed water vapor that forms on the underside of the glass cover 118. As the condensed vapor collects, it naturally drips down due to gravity and the angled design of the glass cover 118, falling into the collection tray 122. The collection tray 122 serves as a receptacle for the distilled water, capturing it as it condenses and flows down from the glass cover 118. The collection tray 122 may be in the shape of a flat-bottomed trough, a rounded-bottom trough, and angled-bottom trough, and the like. In some embodiments, the collection tray 122 may be placed at an angle to the inner face of the first side 114*a*. In some embodiments, there may be more than one collection trays 122 disposed in the solar still 110. Additionally, a glass stopper, optionally made of transparent glass, 124 protrudes down from and is attached to the glass cover 118 over the collection tray 122. In some embodiments, the glass stopper 124 may be made of a plastic material (including a transparent plastic), a metal material, a rubber material, and any other material known in the art. The glass stopper 124 is incorporated to enhance the efficiency of the condensation and collection process. The glass stopper 124 may serve as a point on the glass cover 118 for the condensed water to collect and drip into the collection tray 122. In some embodiments, there may be more than one glass stopper 124 attached to the glass cover 118 over the collection tray 122. In some embodiments, one glass stopper 124 is disposed in one valley of the corrugation in the lower section of the transparent cover 118. In some embodiments, a glass stopper 124 is disposed in one or more valleys of the corrugation in the lower section of the transparent cover 118. In another embodiment, a glass stopper 124 is disposed in each/every valley of the corrugation in the lower section of the transparent cover 118. The glass stopper 124 acts as a barrier that prevents the escaping of water vapor, ensuring that a maximum amount of vapor condenses on the glass cover 118 rather than dispersing into the atmosphere, thereby maximizing the yield of distilled water. The glass stopper 124 also serves as a point where condensed water may collect before dripping into the collection tray 122. Referring again to FIG. 1A, as illustrated, the solar still system 100 also includes a vessel having an open top (as represented by reference numeral 130). FIG. 1C illustrates a detailed diagram of the vessel having an open top 130 (hereinafter, sometimes, generally referred to as "vessel 130," "solar pond," and "pond"). The inclusion of the vessel 130 augments the functionality of the solar still system 100. As depicted, the vessel 130 is designed with a conical (truncated) shape, with a top surface 130*a* and a bottom surface 130*b*. This conical design may enhance the thermal dynamics within the vessel 130, facilitating efficient heat distribution and retention, as preferred for pre-heating the water before it enters the basin 112 for evaporation. Specifically, a surface area of the top surface 130*a* of the vessel 130 is greater than a surface area of the bottom surface 130*b* of the vessel 130. In other words, the top surface 130*a* of the vessel 130 is broader compared to the bottom surface 130*b*. This design allows for a greater surface area at the top, which is exposed to more intense direct solar radiation. The increased exposure at the top surface 130*a* enables the vessel 130 to absorb more solar energy. The conical shape helps in concentrating the heat towards the bottom of the vessel 130, where the water is heated before being transferred to the basin 112.

In the solar still system 100, the vessel 130 is divided into three distinct zones based on their thermal and salinity characteristics, including a lower convective zone 132*a*, a non-convective zone 132*b*, and an upper convective zone 132*c*. Such zoning within the vessel 130 helps in optimizing the heating process by utilizing the varying salinity levels to enhance thermal stratification and convective currents. Herein, the lower convective zone 132*a*, positioned at the bottom of the vessel 130, has the highest salinity among the three zones. The increased salinity in this zone contributes to a higher density and a higher boiling point of the water. This characteristic allows the lower convective zone 132*a* to accumulate and retain more heat, for maintaining a stable thermal layer that can efficiently transfer heat to the water above. Above the lower convective zone 132*a* lies the non-convective zone 132*b*, which has a lower salinity compared to the lower convective zone 132*a* but higher than that of the upper convective zone 132*c*. The non-convective zone 132*b* acts as a thermal buffer, reducing the mixing of water between the lower convective zone 132*a* and the upper convective zone 132*c*. This helps to maintain the thermal gradient for the effective functioning of the solar still system 100. The upper convective zone 132*c*, located at the top of the vessel 130, has the lowest salinity and is where the heated water from below rises as it becomes less dense upon heating. The upper convective zone 132*c* provides the final pre-heating stage before the water moves to the basin 112. It may be appreciated that the conical shape of vessel 130 also facilitates natural convection currents within the water. As the heated water rises towards the wider top surface 130*a*, it circulates back down as it cools, creating a continuous cycle of heating and circulation. This layered approach in the vessel 130, utilizing salinity gradients to create distinct convective zones, enhances ability of the solar still system 100 to heat water more efficiently and uniformly. In some embodiments, a fan, a stir bar, a stirring rod, and/or any other method of mixing may be used to circulate the water in the vessel 130.

The vessel having an open top 130 in the solar still system 100 is designed to optimize the pre-heating and thermal stratification of water through its conical structure and dimensional characteristics. In an embodiment, the top surface 130*a* of the vessel having an open top 130 has a diameter of 0.6 to 1.2 m, preferably 0.7 to 1.1 m, more preferably 0.8 to 1.0 m, and yet more preferably about 0.9 m. This wide diameter at the top allows for a larger surface area to be exposed to solar radiation, thereby capturing a greater amount of heat, for pre-heating the water efficiently. Also, the bottom surface 130*b* of the vessel having an open top 130 has a diameter of 0.1 to 0.5 m, preferably 0.2 to 0.4 m, more preferably about 0.25 to 0.35 m, and yet more preferably about 0.3 m. This narrower base facilitates the concentration of heat towards the center of the vessel 130, enhancing the efficiency of heat transfer to the water as it moves upward through the vessel 130. Further, the vessel having an open top 130 has a height of 0.5 to 2.0 m, preferably 0.6 to 1.8 m, preferably 0.7 to 1.6 m, preferably 0.8 to 1.4, more preferably 0.9 to 1.2 m, and yet more preferably about 1.02 m. Such a height range provides sufficient vertical space for forming distinct thermal zones, i.e., the lower convective zone 132*a*, the non-convective zone 132*b*, and the upper convective zone 132*c*. This maintains a thermal gradient between the bottom and the top of the vessel 130, for effective thermal stratification and the management of salinity gradients. In some embodiments, the lower convective zone 132*a* has a height of 0.05 to 0.15 m, preferably 0.06 to 0.14 m, preferably 0.07 to 0.13 m, preferably 0.08 to 0.12 m, more preferably 0.09 to 0.11 m, and yet more preferably about 0.1 m. In some embodiments, the non-convective zone 132*b* has a height of 0.1 to 0.15 m, preferably 0.11 to 0.14 m, more preferably 0.115 to 0.13 m, and yet more preferably about 0.12 m. In some embodiments, the upper convective zone 132*c* has a height of 0.4 to 1.2 m, preferably 0.5 to 1.1 m, preferably 0.6 to 1.0 m, more preferably 0.7 to 0.9 m, and yet more preferably about 0.8 m.

Also, as shown, the vessel 130 has at least four fins 134. The vessel 130 in the solar still system 100 is optimized for thermal efficiency with the integration of the fins 134. As shown, the fins 134 extend vertically from the bottom surface 130*b* of the vessel 130. It may be understood that the heat storage capacity of the vessel 130 is inversely related to surface area of its bottom surface 130*b*. By incorporating the fins 134, the surface area of the bottom surface 130*b* of the vessel 130 can be expanded, thus increasing the overall efficiency of the solar still system 100. The minimum of four fins 134, as incorporated in the vessel 130, enhances the efficiency of the water heating process in the solar still system 100; however, it may be appreciated that, in alternate configurations, the number of fins 134 may be less (or more) without departing from the spirit and the scope of the present disclosure. In some embodiments, there may be 4 to 32 fins 134, preferably 8 to 24 fins 134, and preferably 12 to 20 fins 134 in the vessel 130. In some embodiments, the fins 134 may be in a linear pattern down a center of the vessel 130. In some embodiments, the fins 134 may be in a zig-zag pattern in the vessel 134. In some embodiments, the fins 134 may be in any pattern known in the art. As discussed, the fins 134 increase the heat transfer area, and thereby help to elevate the temperature of the water more uniformly and quickly. This is particularly relevant in the lower convective zone 132*a*, where the higher salinity and density of the water benefit from more efficient heat distribution to achieve advantageous thermal conditions for effective heating.

The fins 134 are designed to be rectangular in shape. In some embodiments, the fins 134 may have a cylindrical shape, a square shape, a pyramidal shape, and any shape known in the art. The fins 134 are positioned parallel to one another, strategically placed to maximize the surface area available for heat absorption and transfer within the water. In some embodiments, the fins 134 may be placed in an alternating pattern. The dimensions of the fins 134 are selected to enhance the heating dynamics within the vessel 130. In an exemplary configuration, each fin 134 is about 100 to 300 mm, preferably 120 to 280 mm, preferably 140 to 260 mm, preferably 160 to 240 mm, more preferably 180 to 220 mm, and more preferably about 200 mm in height (along vertical direction), providing a large vertical area to capture and distribute heat. Also, each fin 134 is about 30 to 70 mm, preferably 35 to 65 mm, preferably 40 to 60 mm, more preferably 45 to 55 mm, and yet more preferably about 50 mm in breadth (along plane perpendicular to drawing), which ensures that they are wide enough to effectively transfer heat across their surface area while being spaced sufficiently to allow for optimal water circulation around them. Further, each fin 134 is about 0.1 to 5 mm, preferably 0.5 to 4 mm, preferably 1 to 3 mm, more preferably 1.5 to 2.5 mm, and yet more preferably about 2 mm in thickness (along horizontal direction), balancing the need for structural integrity with thermal responsiveness. Moreover, the at least four fins 134 extending vertically from the bottom surface 130*b* of the vessel 130 are positioned 0.005 to 0.1 m, preferably 0.01 to 0.09 m, preferably 0.02 to 0.08 m, preferably 0.03 to 0.07 m, and preferably 0.04 to 0.06 m from each other (along horizontal direction). This improves the surface area available for heat absorption and transfer while allowing sufficient space for water to circulate around them.

Referring to FIG. 1A, the solar still system 100 includes a storage tank 140. The storage tank 140 is designed to hold the saline or brackish water that serves as the raw material for the distillation process. By storing a sufficient volume of water, the storage tank 140 ensures a steady and continuous supply to the solar still 110, particularly to the vessel 130 and the basin 112, facilitating uninterrupted operation of the solar still system 100. The design and operation of the storage tank 140, therefore, help the solar still system 100 to operate effectively and efficiently, providing a reliable source of distilled water. In some embodiments, the storage tank 140 is placed above the vessel 130 and the basin 112 to allow water to flow by gravity. In other embodiments, the storage tank 140 may be placed at the same height as the vessel 130 and the basin 112 and use one or more pumps to move the water. In some embodiments, the storage tank 140 may be made of a plastic material, a metal material, and any other material known in the art. As illustrated in FIG. 1A, the solar still system 100 includes a piping network 150. The piping network 150 efficiently orchestrates the flow of water throughout the solar still system 100. The piping network 150 fluidly connects, in the following order, the storage tank 140 with the vessel having an open top 130, and subsequently, the vessel having an open top 130 with the basin 112 of the solar still 110. This arrangement ensures a systematic and continuous transfer of water for the solar distillation process. The piping network 150 fluidly connects the upper convective zone 132*c* of the vessel 130 with the basin 112. This part of the piping network 150 allows for transferring the pre-heated water from the uppermost layer of the vessel 130, where the water has attained a higher temperature due to solar heating and the natural convective currents within the vessel 130.

In some embodiments, the solar still system 100 incorporates flow control valves for controlling transfer of water via the piping network 150. Specifically, the solar still system 100 includes a first flow control valve 152 positioned between the storage tank 140 and the vessel 130, and a second flow control valve 154 positioned between the vessel 130 and the basin 112. The first flow control valve 152 is configured to manage the rate and volume of water that is allowed to flow from the storage tank 140 into the vessel 130. By regulating this flow, the first flow control valve 152 ensures that the vessel 130 operates under optimal conditions, maintaining a balance between the water supply and the thermal capacity of the vessel 130 to pre-heat the water efficiently. Similarly, the second flow control valve 154 is configured to control the transfer of pre-heated water from the vessel 130 to the basin 112. Thus, the second flow control valve 154 allows for the adjustment of water flow based on the evaporation capacity of the basin 112, ensuring that the basin 112 receives only so much water which it can efficiently evaporate. In present configurations, the solar still system 100 may employ a controller for regulating functioning of the first flow control valve 152 and the second flow control valve 154, with details of the controller being discussed later in the description with reference to FIGS. 11-14. In some embodiments, the first flow control valve 152 and the second flow control valve 154 may be controlled manually. The first flow control valve 152 and the second flow control valve 154 may be in a fully closed position, a fully open position, and any position in between allowing for a constant stream of water to flow at a rate which a user may choose/determine.

In FIG. 1A, the solar still system 100 includes a collection tank 160. The collection tank 160 serves as a final repository for the distilled water produced within the solar still system 100. The collection tank 160 is fluidly connected to the collection tray 122 via the piping network 150 for efficiently transporting the condensed and collected water from the collection tray 122 to the collection tank 160, ensuring that the distilled water is securely stored and readily available for use. The fluid connection facilitated by the piping network 150 between the collection tray 122 and the collection tank 160 allows for a continuous flow of distilled water, minimizing the risk of overflow or stagnation within the collection tray 122. This ensures that the basin 112 can operate continuously without interruption due to the collection tray 122 reaching its capacity.

Figure 2:
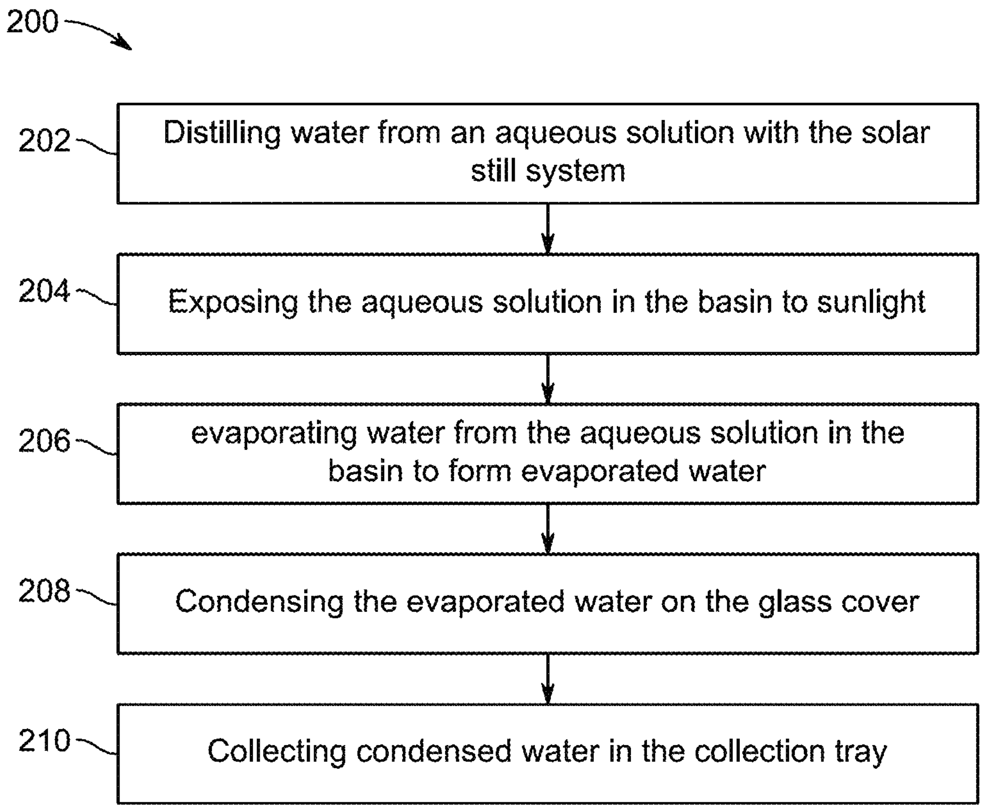
FIG. 2 is an exemplary flowchart of a method of desalination, according to certain embodiments.

The present disclosure further provides a method of desalination. FIG. 2 illustrates a flowchart listing steps involved a method of desalination, as represented by reference numeral 200. The order in which the method 200 is described is not intended to be construed as a limitation, and any number of the described method steps can be combined in any order to implement the method 200. Additionally, individual steps may be removed or skipped from the method 200 without departing from the spirit and scope of the present disclosure. These steps are only illustrative, and other alternatives can also be provided where one or more steps are added, one or more steps are removed, or one or more steps are provided in a different sequence without departing from the scope of the claims herein. Various aspects and variants disclosed above, for the aforementioned solar still system 100 apply to the method 200, as discussed in the proceeding paragraphs. The method 200 efficiently utilizes the natural resources of sunlight and water, providing a sustainable solution for producing fresh, potable water from saline sources through the solar still system 100.

At step 202, the method 200 includes distilling water from an aqueous solution with the solar still system 100. Herein, the aqueous solution comprises one or more salts. The process begins with the aqueous solution stored in the storage tank 140, which serves as the initial reservoir for the saline or brackish water that is the subject of the desalination process. The distilling includes flowing the aqueous solution from the storage tank 140 to the vessel having an open top 130 and from the vessel having an open top 130 to the basin 112. That is, the distillation process involves the transfer of the aqueous solution from the storage tank 140 to the vessel having an open top 130. This transfer is facilitated by the piping network 150, which includes the first flow control valve 152 to regulate the flow rate and volume entering the vessel 130. Once in the vessel 130, the aqueous solution is subjected to a pre-heating process, where it is heated by solar energy absorbed through structure of the vessel 130 and the fins 134 that extend vertically from the bottom surface 130*b* therein. After pre-heating, the aqueous solution flows from the vessel 130 to the basin 112, again facilitated by the piping network 150, which includes the second flow control valve 154 to manage the entry of the heated water into the basin 112.

At step 204, the method 200 includes exposing the aqueous solution in the basin 112 to sunlight. In the basin 112, the aqueous solution is exposed to direct sunlight, maximizing the absorption of solar radiation which increases the temperature of the water, thus enhancing the rate of evaporation. At step 206, the method 200 includes evaporating water from the aqueous solution in the basin 112 to form evaporated water. The water in the basin 112 evaporates due to the increased temperature from the solar exposure. This evaporation process transforms the aqueous solution into vapor, leaving behind the salts and other impurities. At step 208, the method 200 includes condensing the evaporated water on the glass cover 118. The evaporated water then rises and condenses on the underside of the glass cover 118, which is angled to facilitate the flow of the condensed water towards the glass stopper 124 and the collection tray 122. At step 210, the method 200 includes collecting condensed water in the collection tray 122. That is, the condensed water, free from salts and impurities, is collected in the collection tray 122. The condensed water may be collected on the glass stopper 124 before being collected in the collection tray 122. Further, the distilled water flows through the piping network 150 into the collection tank 160, where it is stored to be ready for use.

The method 200, as applied to the solar still system 100, demonstrates an improvement in the efficiency and productivity of water distillation. In an embodiment, water obtained by the distilling from the solar still system 100 is increased 50 to 55 percent by volume (%), preferably 51 to 54%, preferably 52 to 55%, and more preferably about 52% in comparison to the same solar still system in the absence of fins. That is, by incorporating fins within the solar still system 100, there is an increase of 50 to 55 percent by volume in the water obtained from distillation compared to the same system without the integration of fins. This may be attributed to the increased surface area for heat transfer facilitated by the fins, which accelerates the heating and evaporation processes. Moreover, as established by method 200, the solar still system 100 has a productivity rate of 2 to 4 liters per hour (L/h), preferably 2.5 to 3.5 L/h, more preferably 2.9 to 3.2 L/h, and yet more preferably about 3.1 L/h. This rate is indicative of capability of the solar still system 100 to efficiently convert saline or brackish water into freshwater. The presence of fins within the basin 112 and the vessel 130 contributes to a more uniform and quicker heat distribution, which correlates with the higher productivity rates observed. Additionally, the method 200 results in the solar still system 100 having a freshwater output 0.35 to 0.45 L/m$^2$, preferably 0.37 to 0.43 L/m$^2$, more preferably 0.39 to 0.41 L/m$^2$, and yet more preferably about 0.404 L/m$^2$ at a solar intensity of 790 to 830 W/m$^2$, preferably 795 to 825 W/m$^2$, preferably 800 to 820 W/m$^2$, more preferably 805 to 815 W/m$^2$, and yet more preferably about 810 W/m$^2$. This metric showcases effectiveness of the solar still system 100 in utilizing available solar energy to maximize water distillation, particularly due to the use of the fins 120, 134 and optimized flow control, improving the overall performance of the solar still system 100 under specified environmental conditions.

The solar still system 100 and the method 200 of the present disclosure implement an integrated fin-type solar still with finned vessel configuration, which also may generally be referred to as single basin fin-type solar still with fin-type solar pond, or ISBSS hereinafter. The solar still system 100 operates through a sequence of stages to efficiently convert saline or brackish water into distilled water using solar energy. The process begins at the storage tank 140, which serves as the reservoir for raw water. Water from the storage tank 140 is controlled by the first flow control valve 152, which regulates the flow into the vessel having an open top 130 via the piping network 150. The vessel 130 is designed with a conical shape to maximize solar heat absorption and facilitate efficient heat distribution through its three distinct zones, i.e., the lower convective zone 132*a*, the non-convective zone 132*b*, and the upper convective zone 132*c*. The vessel 130 is equipped with multiple fins 134 that extend vertically from the bottom surface 130*b*, enhancing the surface area for heat transfer. In the vessel 130, water first encounters the lower convective zone 132*a*, where the highest salinity aids in heat retention and minimizes upward convective currents. The non-convective zone 132*b* acts as a thermal barrier, preventing rapid temperature changes and maintaining a stable environment conducive to efficient heating. The heated water then moves to the upper convective zone 132*c*, where it is closest to the top surface 130*a*, receiving the most solar exposure and reaching higher temperatures.

The pre-heated water is then transferred from the upper convective zone 132*c* to the basin 112 via the piping network 150 and the second flow control valve 154, which manages the rate at which water enters the basin to optimize evaporation conditions. The basin 112 is equipped with multiple fins 120 that extend vertically from its bottom surface 112*a*, enhancing the surface area for heat transfer and ensuring uniform heating and evaporation of the water. As the water evaporates, the resulting vapor condenses on the underside of the glass cover 118, which is angled to direct the condensate towards the collection tray 122 located beneath it via the glass stopper 124. The glass cover 118 also redirects any remaining solar radiation back into the basin 112, enhancing the evaporation rate. The condensed water collected in the collection tray 122 is then channeled through the piping network 150 into the collection tank 160 for storage until use.

FIGS. 3-6, illustrate various alternative configurations of solar stills as implemented in different scenarios, each designed to cater to specific distillation needs and environmental conditions. These figures illustrate variations in the arrangement and interaction of components like basins, storage tanks, and collection mechanisms, showcasing diverse methods to harness solar energy for water distillation. Most of the components in these configurations are common to the solar still system 100, and thus not described herein for brevity of the present disclosure. The descriptions of these configurations highlight the differences with respect to the solar still system 100 (as described in the preceding paragraphs), emphasizing how each configuration may differ than the solar still system 100.

Figure 3:
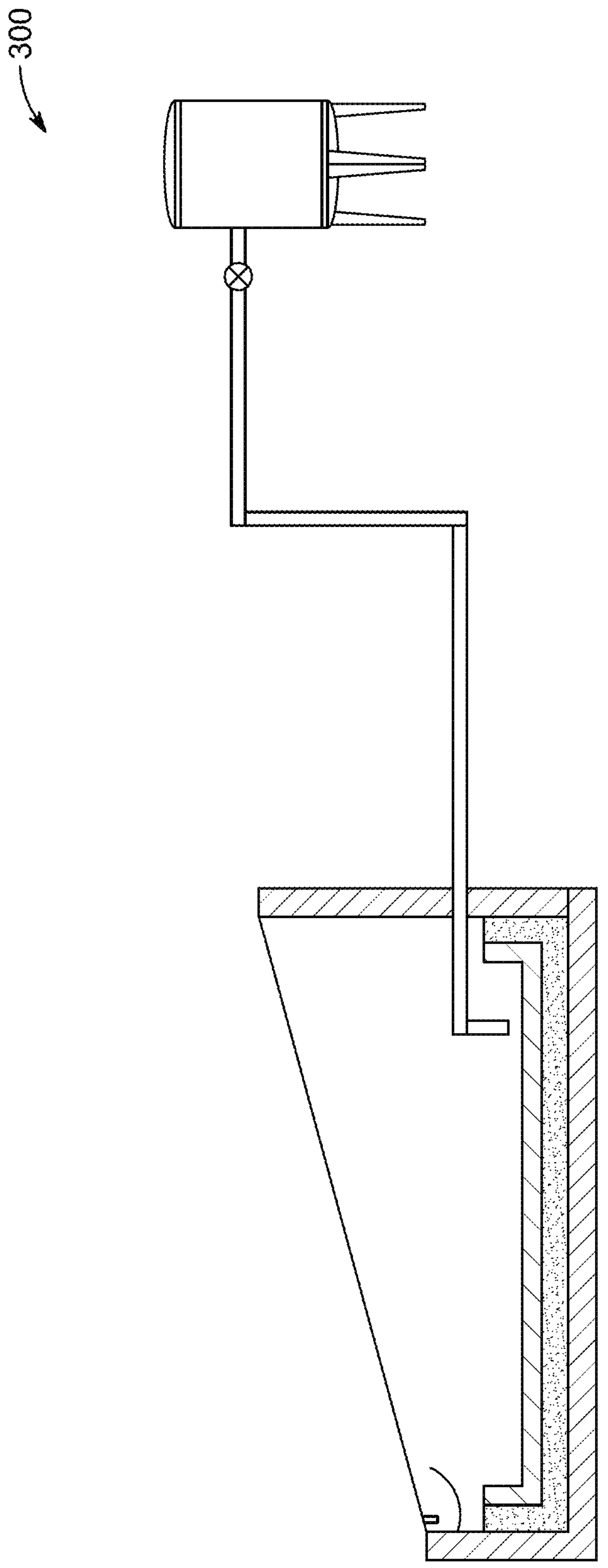
FIG. 3 is an exemplary diagram of a solar still having a basin combined with a storage tank, according to certain embodiments.

FIG. 3 illustrates an exemplary diagram of a solar still system (as represented by reference numeral 300) having a basin combined with a storage tank, also known as single basin solar still (hereinafter, referred to as SBSS). In the solar still system 300, the saline water in the basin is heated by solar radiation passing through the glass, causing evaporation, the vapor then condenses on the glass and collects in a tray beneath it, ultimately being stored in an adjacent tank. This design uses passive heating and natural condensation, with its efficiency dependent on direct sunlight and minimal thermal management. In contrast to the solar still system 100, the solar still system 300 lacks enhancements such as systematic water flow control through valves for optimized heating phases, the use of a vessel for pre-heating the water, and the integration of fins in the basin and the vessel to increase the surface area for heat transfer. This leads to reduced operational efficiency and effectiveness of the solar still system 300.

Figure 4:
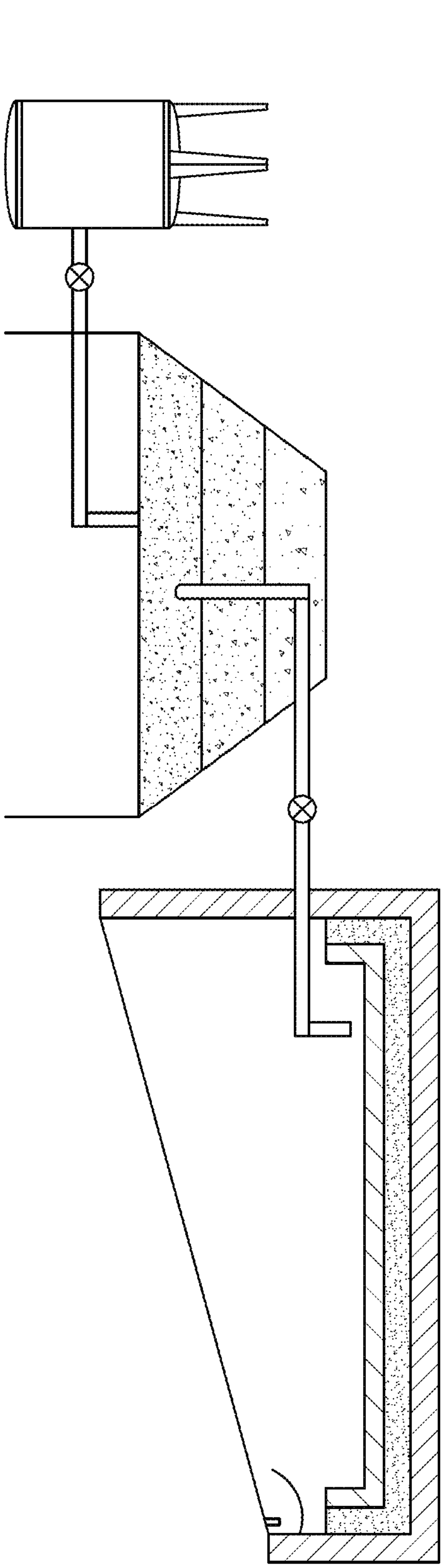
FIG. 4 is an exemplary diagram of a solar still having a basin combined with a vessel and a storage tank, according to certain embodiments.

FIG. 4 illustrates an exemplary diagram of a solar still system (as represented by reference numeral 400) having a basin combined with a vessel and a storage tank, also known as mini-pond (vessel) and solar still (hereinafter, referred to as SBSS-P). In the solar still system 400, the saline water from the storage tank is first transferred to the vessel where it undergoes pre-heating through solar exposure. This pre-heated water then flows into the basin, where further solar radiation induces evaporation. The evaporated water vapor condenses on the glass and subsequently collects in a tray, which channels the distilled water for use. This design utilizes passive solar heating for the evaporation process and incorporates the vessel to enhance the heating efficiency by pre-warming the water before it reaches the basin, ensuring more effective evaporation. In contrast to the solar still system 100, the solar still system 400 lacks the integration of fins in both the vessel and the basin that may otherwise increase the surface area for heat transfer. This leads to lower operational efficiency and reduced ability to perform more consistently across diverse environmental conditions.

Figure 5:
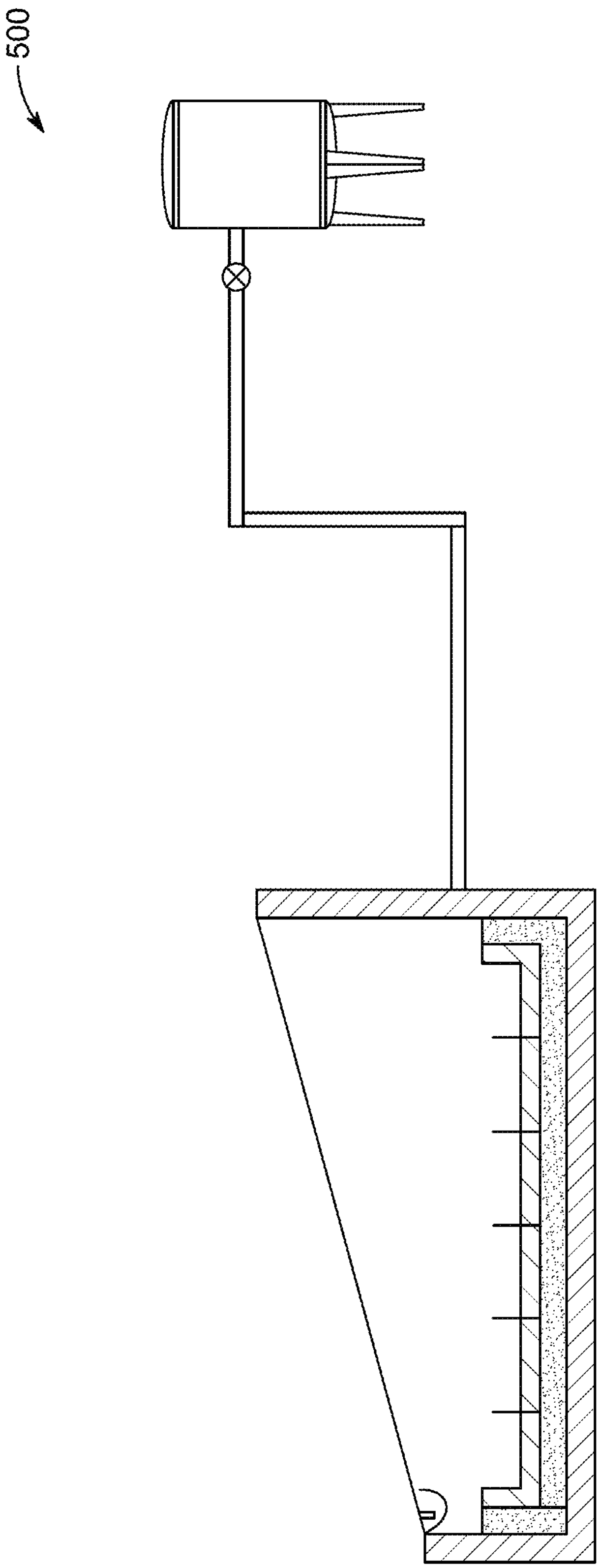
FIG. 5 is an exemplary diagram of a solar still having a basin with fins combined with a storage tank, according to certain embodiments.

FIG. 5 illustrates an exemplary diagram of a solar still system (as represented by reference numeral 500) having a basin with fins combined with a storage tank, also known as solar still with fin (hereinafter, referred to as SBSS-F). In the solar still system 500, the saline water is stored in the storage tank and then directed into the basin, which incorporates the fins. These fins enhance the solar heating efficiency by increasing the surface area exposed to sunlight, thereby improving the water heating and evaporation processes. As the water evaporates, the resultant vapor condenses on the glass cover positioned above the basin and is collected in a tray that channels the distilled water for use. This setup leverages both passive solar heating and active heat distribution through the fins in the basin to facilitate more effective and faster evaporation compared to systems without fins. In contrast to the solar still system 100, which incorporates additional enhancements like systematic water flow control and advanced insulation techniques, the solar still system 500 focuses on optimizing heat absorption capabilities of the basin through the integration of fins, and may not offer the same level of efficiency or consistency across various environmental conditions.

Figure 6:
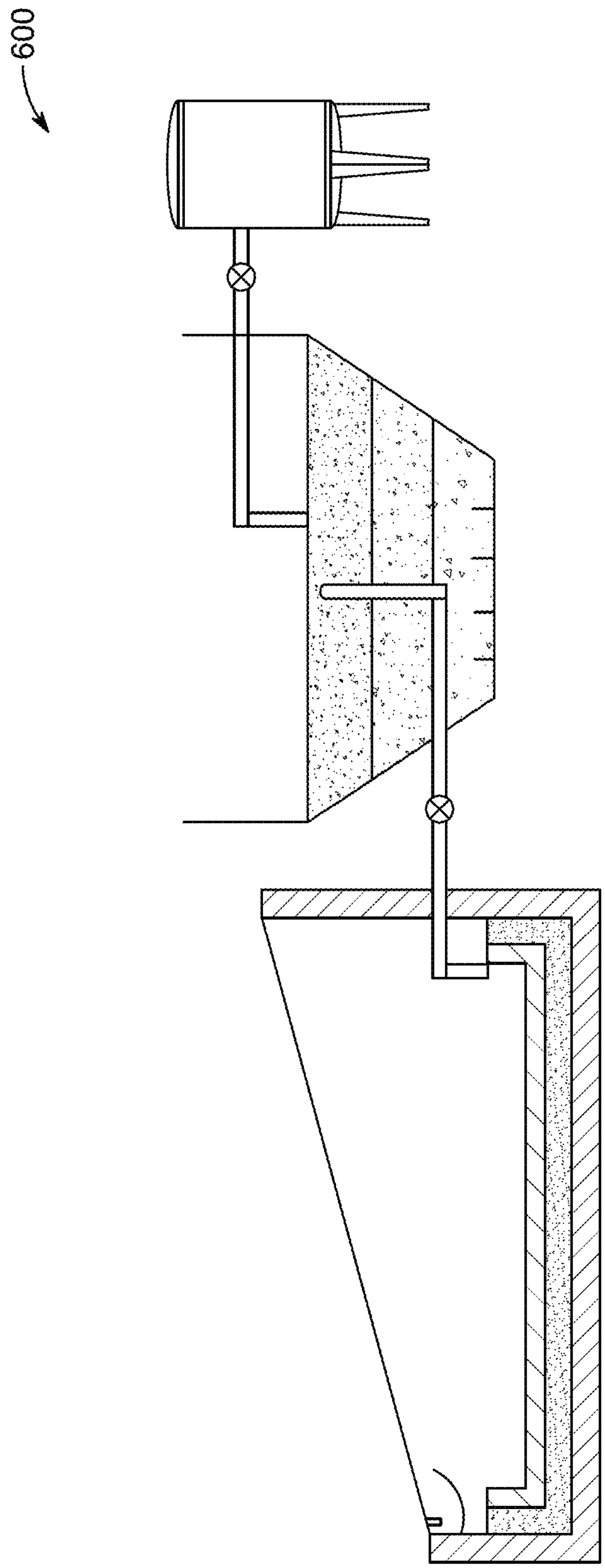
FIG. 6 is an exemplary diagram of a solar still having a basin combined with a vessel having fins and a storage tank, according to certain embodiments.

FIG. 6 illustrates an exemplary diagram of a solar still system (as represented by reference numeral 600) having a basin combined with a fin-equipped vessel and a storage tank, also known as mini fin-type solar pond (vessel) with solar still (hereinafter, referred to as SBSS-FP). In the solar still system 600, the saline water from the storage tank is first channeled into the vessel, which incorporates fins to enhance the heating efficiency through improved surface area exposure to solar energy. This pre-heated water then flows into the basin, where it is further subjected to solar radiation to induce evaporation. The evaporated water vapor condenses on the glass cover above the basin and is subsequently collected in a tray that channels the distilled water for use. This configuration takes advantage of passive solar heating augmented by the fins in the vessel, which facilitate a more effective pre-heating process and, thereby, enhance the overall evaporation efficiency. While similar to the solar still system 100 in utilizing fins (like the fins 134) for enhanced heat transfer, the solar still system 600 differs in lack of fins in the basin as well as in its more simple integration of these components, affecting its efficiency and performance consistency across different environmental conditions.

In general, in the solar still system 100 of the present disclosure, the integration of the basin 112 incorporating the fins 120 and the vessel 130 incorporating the fins 134 improves the use of natural solar energy. In contrast to conventional systems that either use passive solar still designs with limited productivity or complex and often costly active heating systems, this integrated approach leverages simple, yet highly effective modifications to enhance performance. This configuration acts as a thermal buffer, storing heat during peak sunlight hours and continues to release this heat into the still during less sunny periods or at night. This consistent heat supply helps in maintaining continuous evaporation, which increases daily distilled water output. The solar still system 100 maximizes freshwater production by using direct solar energy and the heat retained in the vessel 130 and has potential as a decentralized and sustainable water purification solution.

Examples

The following examples demonstrate solar still systems for water desalination. The examples are provided solely for illustration and are not to be construed as limitations of the present disclosure, as many variations thereof are possible without departing from the spirit and scope of the present disclosure.

Single Basin Solar Still (SBSS)

FIG. 3 shows a schematic view of a conventional SBSS. Storage tanks, solar still, thermometers, and piping networks make up the standard solar still. Storing tanks and solar stills are part of conventional solar still with thermally insulated pipelines. The galvanized iron solar still is 2 mm thick and 0.12 m deep. The SBSS has been painted matte black from top to bottom to optimize solar absorption. The wooden box, which measures 1.2 m×1.2 m×0.19 m thick and 0.1 m high, includes the basin of SBSS. The interior of the wooden box was painted white to maximize the quantity of sunlight that reached the water's surface. Sawdust is positioned between the wooden crate and the still basin to reduce heat loss. The experimental setup is fabricated and tested in Pongalur (10.9729° N, 77.3698° E) latitude, and at an angle of 10° is used to lay the plain 5 mm thick glass on top of a wooden crate. As a precaution against rain and sun radiation, the sheet metal covers all five sides of a wooden crate.

Combining a Mini-Pond and Solar Still (SBSS-P)

The low output of SBSS is correlated to the inflow of water heat, which is a big operating parameter. Solar stills pre-heat the water used as the input for the mini solar pond. An SBSS-P is shown in FIG. 4. The mini solar pond's top and bottom surface area is 0.63 and 0.07 $m^2$, respectively. The solar pond's axial height is 0.3 m. A challenge in utilizing solar ponds for desalination is improving their efficiency. This can be done by dividing mini solar ponds into three distinct regions: the lower convective zone (LCZ), the non-convective zone (NCZ), and the upper convective zone (UCZ). Saturated brine is used to preserve LCZ's consistent and high-concentration salt. Due to the increase in the specific heat of the water caused by the rise in salinity, the boiling point of the water also rises. To prevent thermal loss from the LCZ, the NCZ salinity increases with depth.

Solar Still with Fins (SBSS-F)

As demonstrated in FIG. 5, five fins were added to the SBSS to increase its total surface area. The fins were equally spaced and measured 900 mm in length, 35 mm in breadth, and 2 mm in thickness. Increasing the absorber's surface area with fins permits excellent convection heat transfer from the basin to the water.

Mini Fin-Type Solar Pond with Solar Still (SBSS-FP)

The mini solar pond's heat storage capacity is inversely related to the pond's base area. By including fins, the solar pond's bottom surface area can be expanded. For SBSS-FP, four fins were considered. The solar pond's occupancy rate (area %) determined the fin count. FIG. 6 depicts the solar pond's basin, which consists of four solid rectangular fins. The fins have dimensions of 200 mm in length, 50 mm in breadth, and 2 mm in thickness. Increased size has also increased the LCZ's exposed surface area to convective heat transmission from the pond's bottom surface.

Single Basin Fin-Type Solar Still with Fin-Type Mini-Pond (ISBSS)

FIG. 1A shows the ISBSS. In this configuration, solar stills use solar energy to vaporize water from a basin, leaving behind impurities, and then collect the condensed condensation on fin-like structures. Until then, the mini solar pond with fins serves as an additional heat source, increasing the efficacy of the still by utilizing sunlight to heat the basin and fins. This combined system maximizes freshwater production by using direct solar energy and heat retained in the micro solar pond. It has potential as a decentralized and sustainable water purification solution.

Experimental Procedure

Experiments were conducted at Pongalur, close to Tirupur (10.9729° N, 77.3698° E), at 10° north latitude. Bay of Bengal seawater was collected for experimental purposes. The experimentation was conducted on 22 May 2023, from 9 AM to 5 PM. Four thermocouples were installed in various locations to measure basin and water temperatures, and a digital temperature indicator was connected to them. A solarimeter measured global solar radiation. An anemometer measured the productivity of distillate water. Three operating parameters of the solar still were slope angle (10°), water depth (3 cm), and ambient inlet water temperature (30 °C) were considered for this experiment. A polyvinyl chloride (PVC) conduit and flow control valve connected the solar still to the solar pond to produce heated water in sections. The lower convective zone (LCZ) heats a copper heat exchanger that circulates water from the upper convective zone (UCZ). The flow control valve was opened every half-hour to receive the preheated water in the basin. To balance the water level in the UCZ, saline water was added to the vessel/solar pond. Every hour, measurements were recorded.

Theoretical Analysis

For the theoretical estimation of SBSS and its modification, the energy balance equation is considered. The basin energy balance equation is the sum of all the energy gained and lost through convective heat transfer, as well as side losses $Q_{loss}$ that are received by the basin plate in solar still.

For basin:

$$\text{Area } (A_b) = 0.37 \text{ m}^2 \tag{1}$$

$$\text{Water Absorption } (\alpha_b) = 0.95$$

$$\text{Mass } (m_b) = 9 \text{ kg}$$

$$I(t) = (I_g \cdot I_d) \cdot (\cos \cdot \theta_i / \cos \cdot \theta_h) + I_d(1 + \cos \cdot \beta)/2$$

where $\theta_i$ represents incidence angles of solar still;

$$\theta_1 = \cos^{-1}[\cos \cdot (\varphi - \beta) \cdot \cos \cdot \delta \cdot \cos \omega \cdot \sin \cdot (\varphi - \beta) \cdot \sin \delta] \tag{2}$$

$\theta_h$ represents horizontal angles of solar still;

$$\theta_h = \cos^{-1}[\cos \varphi \cdot \cos \beta \cdot \cos \omega \cdot + \sin \varphi \cdot \sin \delta] \tag{3}$$

Absorptivity of still water $(\alpha_w)=0.05$

The convective heat transferring from basin to water is derived by:

$$Q_{c,b-w} = h_{c,b-w}(T_b - T_w)A_b \tag{4}$$

$$h_{c,b-w} = (16.274 \times 10^{-3})(p_w - p_g)/(T_w - T_g)$$

Loss of heat:

$$Q_{loss} = U_b(T_b - T_a)A_b \text{ for water} \tag{5}$$

Conventional radiation, evaporation heat transfer, and side losses are included because salty water receives energy from the sun and base. Assuming that salt water absorbs energy from the sun and absorber plate, this summation includes the energy lost owing to convectional, radiation, and evaporation heat transfer and side losses.

$$I(t)\alpha_w + Q_{c,b-w} = m_w c_{p,w}(dT_w/dt) + Q_{loss} + Q_{c,w-g} + Q_{r,w-g} + Q_{e,w-g} \tag{6}$$

whereas $$\text{Mass } (mw) = 5 \text{ kg} \tag{7}$$

Heat transfer for side loss $$Q_{loss} = U_b(T_w - T_g)A \tag{8}$$

$$\text{where } U_b = 14 \ W \cdot m^{-2} k^{-1}$$

Convectional transfer of heat from water to glass can be evaluated by subsequent formulation [Dwivedi, V. K. & Tiwari, G. N. 2010 Experimental validation of thermal model of a double slope active solar still under natural circulation mode. *Desalination* 250 (1), 49-55, incorporated herein by reference in its entirety].

$$Q_{c,W-g} = h_{c,w-g}(T_{w-T_g})A \quad (9)$$

$$h(c, w-g) = 0.885 \cdot \left[T_w - T_g + \frac{(P_w - P_g)(T_w + 273)}{3 \times 10^3 - P_w}\right]^{1/3}$$

where $P_w$ is the partial pressure for water vapour; $T_w$ is the temperature of the water (°C), $T_g$ is the temperature of the glass (°C.)

$$P_w = 7235 - 431.45T_w + 10.76T_w^2 \quad (10)$$

where $P_g$ is the saturated partial pressure at condensing glass cover $$P_g = 7235 - 431.45T_g + 10.76T_g^2 \quad (11)$$

The formula can be used to calculate the radiation transfer of heat between water and glass.

$$Q_{w,w-g} = \sigma\varepsilon \cdot (T^4w - T^4g) \cdot A \quad (12)$$

$$\sigma = 0.567 \times 10^{-7}$$

$$\varepsilon_{eff} = (1/\varepsilon_w + 1/\varepsilon_8)^{-1}$$

$T_w$ and $T_g$ represent water as well as glass temperature (°C), respectively.

Heat transferring from water and glass evaporation can be estimated using the subsequent equation.

$$Q_{e,w-g} = h_{e,w-g} \cdot (T_w - T_g)A \quad (13)$$

$$h_{e,w-g} = (16.274 \times 10^{-3}) \cdot h_{san-g} \cdot (p_w - p_g)/(T_w - T_g)q$$

For Glass:

An increase in the amount of energy that passes through a glass lid is equal to the sum of all the energy losses that occur as a result of heat transfer, whether it be radiation or convective. Glass produces a lot of energy.

$$I(t)\alpha_g + Q_{r,w-g} + Q_{c,w-g} + Q_{e,w-g} = Q_{r,g-sky} + Q_{c,g} - \text{sky} + m_g c_{p,g}(dT/dt)_g \quad (14)$$

$$\text{Absorption of glass } (\alpha_g) = 0.07$$

Transfer of heat by radiation among glass and sky $$Q_{rg-sky} = \sigma\varepsilon_{eff} \cdot (T_g^4 - T^4 \cdot \text{sky})A_g \quad (15)$$

where σ represents the Stefan-Boltzmann constant, 5.67× $10^{-8}$ W·m$^{-2}$ k$^{-4}$; $T_{sky}$ is the radiation temperature (°C), and $T_g$ is the evaporated water temperature (°C.).

$$\varepsilon_{eff} = (1/\varepsilon_{yg} + 1/\varepsilon_{lg})^{-1} \quad (16)$$

$$T_{sky} = \text{temperature} = T_a - 6 \quad (17)$$

whereas $T_a$ is the ambient temperature; $\varepsilon_{lg}$ and $\varepsilon_{yg}$ represent the lower and upper glass emissivity.

Saline water-specific heat Cp can be calculated from formulas [See: Dwivedi & Tiwari 2010]:

$$C_{p,w} = a_1 + a_2T_w + a_3T_w + a_4T_w \quad (18)$$

$a_1$, $a_2$, $a_3$, and $a_4$ are considered to be constant.

$$a_1 = 4208.8 - 6.6197s + 1.2288 \times 10^{-2}s^2 \quad (19)$$

$$a_2 = -1.1262 + 5.4178 \times 10^{-2}s - 2.2719 \times 10^{-4}s^2 \quad (20)$$

$$a_3 = 1.2026 \times 10^{-2} - 5.5366 \times 10^{-4}s - 1.8906 \times 10^{-6}s^2 \quad (21)$$

$$a_4 = 6.8774 \times 10^{-7} + 1.517 \times 10^{-6}s - 4.4268 \times 10^{-9}s^2 \quad (22)$$

To begin with, the temperatures of the water, basin, and glass are all considered to be ambient. Equations 6 and 7 are used to calculate temperature changes in water ($d_{tw}$), basin temperature ($d_b$), and temperature changes in glass as in Equation 12. By using the MATLAB program, Equations 6 and 12 were solved. The flat plate collector's internal heat losses are equal to the solar still's energy intake.

The Cumulative Condensation:

The Total Condensation Rate was Evaluated by Formulas:

$$\frac{dm_c}{dt} = \frac{h_{e,w-g}(T_w - T_g)}{h_{fg}} \quad (23)$$

whereas $h_{fg}$ can be evaluated from the subsequent equivalences.

$$h_{fg} = (597.48 - 5.6626 \times 10^{-1}T_{ww} + 1.5083 \times 10^{-4}T_w^2 - 3.2765 \times 10^{-6}T_w^3) \times 4.1869 \quad (24)$$

Figure 7A:
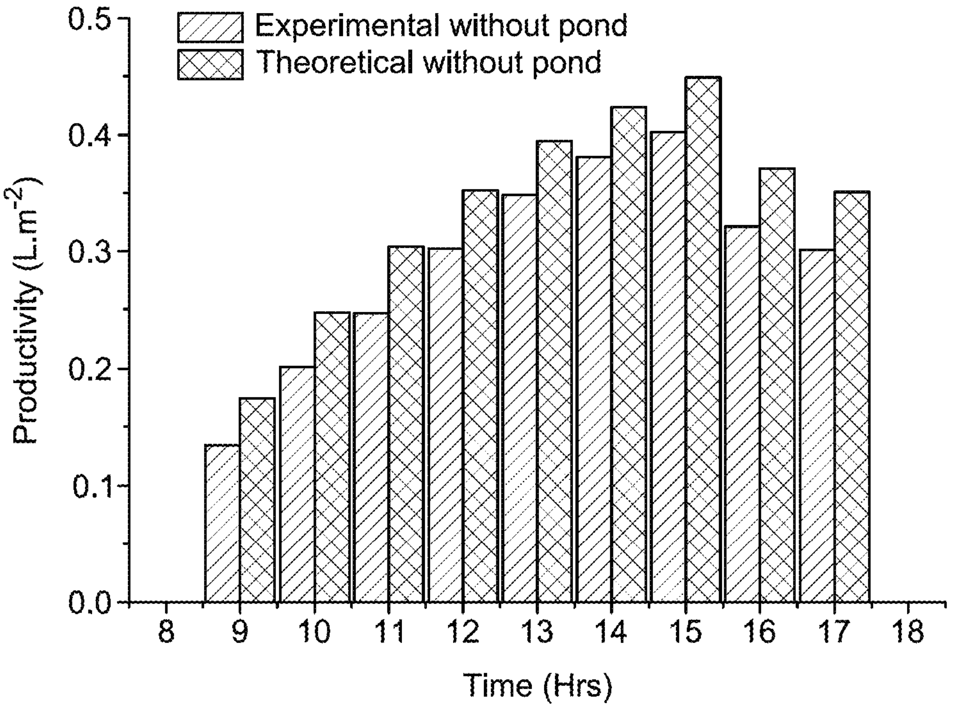
FIG. 7A is a graph depicting experimental and theoretical productivity of a solar still having a basin without a vessel (pond), according to certain embodiments.
Figure 7B:
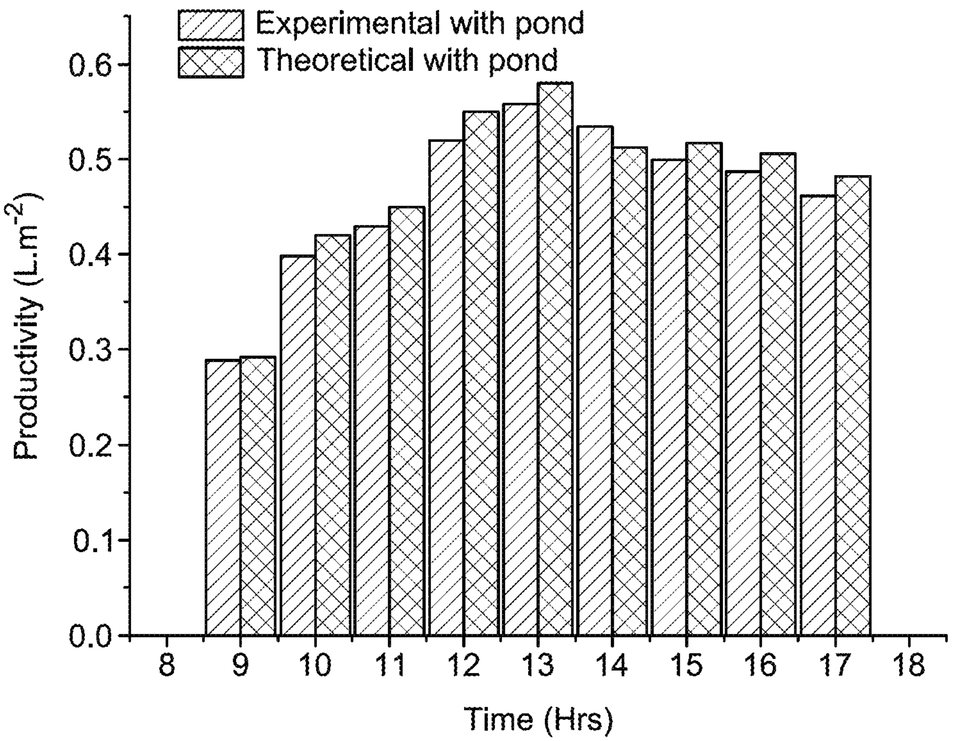
FIG. 7B is a graph depicting experimental and theoretical productivity of a solar still having a basin combined with a vessel (pond), according to certain embodiments.

The LCZ of the solar system heats the seawater as it transports it to the basin where the solar system is located. The saltwater in the solar pond is preheated by solar radiation. The temperature variance between water and glass expands even more as preheating water is transferred to the solar still. The experiments were carried out from morning (9 AM) to evening (5 PM) on the 22nd of May in 2023. FIG. 7A and FIG. 7B, illustrate graphs depicting productivity of a solar still having a basin without a vessel (pond) and with a vessel (pond), respectively. FIG. 7A demonstrates the comparison of theoretical and experimental productivity of SBSS without a solar pond (vessel). The maximum quality of freshwater output was observed around 0.40 L·m$^{-2}$ (experimental) and 0.45 L·m$^{-2}$ (theoretical), which was obtained at 3 PM. Solar water outputs may be slowed without a solar pond. Solar ponds may preheat water before it reaches the still to speed up evaporation. The water may take longer to attain temperatures for effective distillation if this preheating is not done. From FIG. 7B, it was observed that the maximum freshwater productivity of SBSS-P (single basin solar still with a pond/vessel) was 0.557 $L \cdot m^{-2}$ (experimental) and 0.579 $L \cdot m^{-2}$ (theoretical), which was obtained at 1 PM. The solar still's performance and efficiency can be improved by combining it with a solar pond. The solar pond's heated water can be used to heat the solar still, allowing it to produce more potable water at higher temperatures. Incorporating a small solar pond into the still boosted its production, as seen in FIG. 7A and FIG. 7B, which is raised by an average of 27.6%.

Figure 8A:
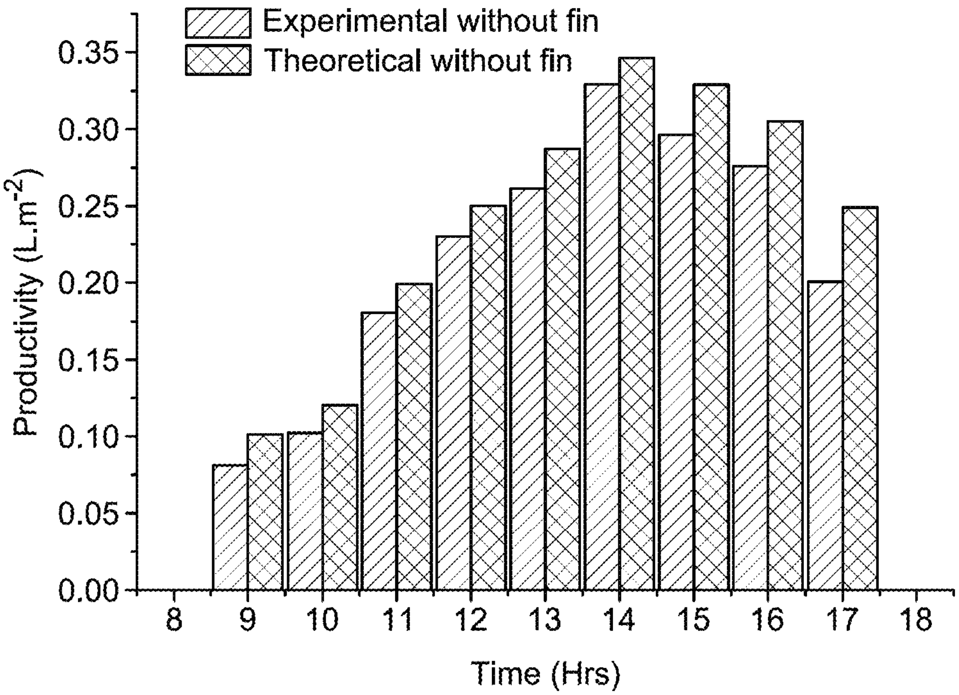
FIG. 8A is a graph depicting experimental and theoretical productivity of a solar still having a basin without fins, according to certain embodiments.
Figure 8B:
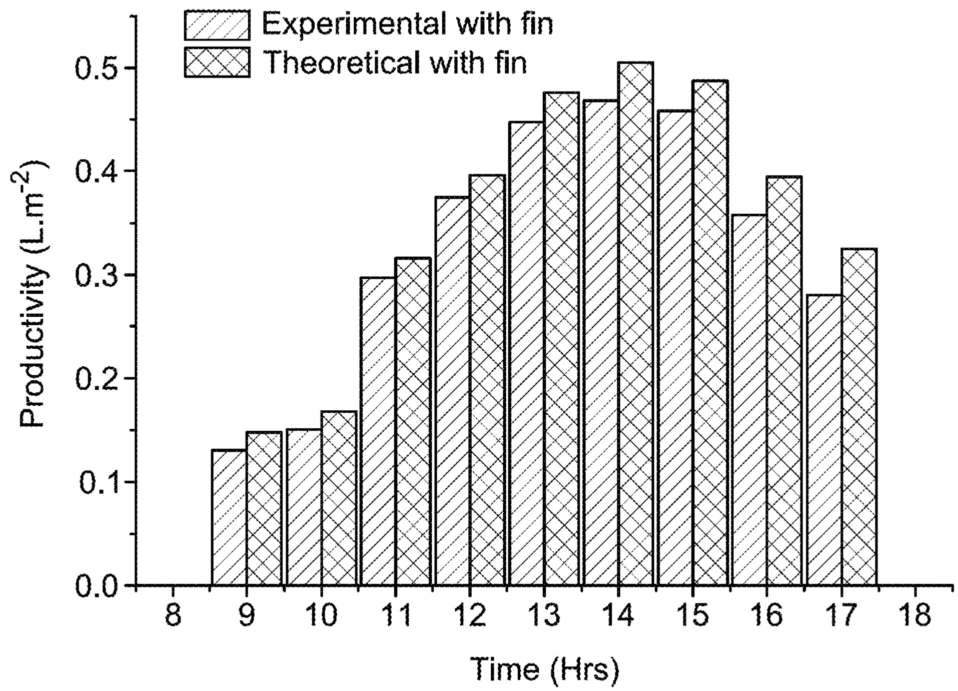
FIG. 8B is a graph depicting experimental and theoretical productivity of a solar still having a basin with fins, according to certain embodiments.
Figure 8C:
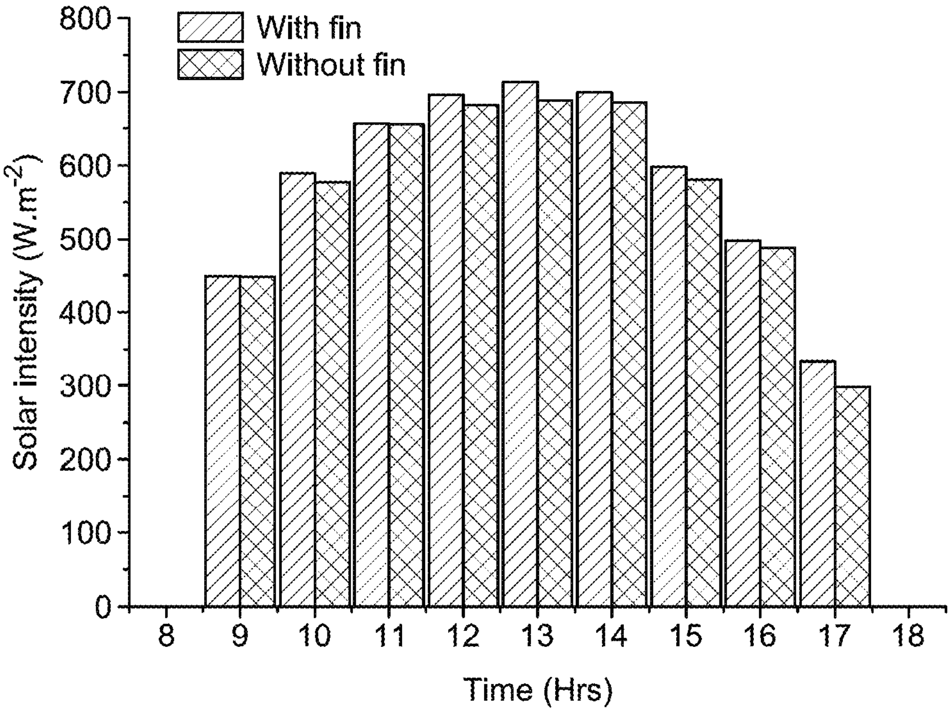
FIG. 8C is a graph depicting experimental and theoretical variations of solar intensity for a solar still having a basin with and without fins, according to certain embodiments.

FIGS. 8A-8C illustrate graphs depicting productivity of a solar still having a basin without and with fins, and variation of solar intensity therein. Adding fins to the SBSS promotes more solar energy being collected due to the higher surface area of the basin provided by fins. Because of this, salty water evaporates faster, boosting production. FIG. 8A shows the maximum productivity of freshwater output without fins was 0.33 $L \cdot m^{-2}$ (experimental) and 0.35 $L \cdot m^{-2}$ (theoretical), which was observed around 2 PM. The SBSS-F may generate fresh water more slowly than variants due to its lower efficiency. It may take more time to produce the output and sunlight exposure needed to produce a suitable volume of distilled water could be a constraint, especially in locations with a high water demand and few sunlight hours. Further, from FIG. 8B, it was observed that the maximum productivity of SBSS-F was around 0.47 $L \cdot m^{-2}$ (experimental) and 0.50 $L \cdot m^{-2}$ (theoretical), which was achieved at 2 PM. In comparison to a basic solar still without fins, SBSS-F may greatly boost solar production. Adding fins, also known as heat-absorbing collectors, improves solar energy absorption and heat transfer to the water within the still. This results in increased freshwater output, quicker evaporation rates, and warmer water temperatures. From FIG. 8C, the maximum solar intensity with and without fins was observed around 711 and 686 $W \cdot m^{-2}$, respectively, at 1 PM. The integration of fins into a solar system affects sunlight intensity. The solar intensity is improved by the use of fins, resulting in better solar energy absorption and utilization. The use of fins at the still's bottom has been shown to boost productivity by 46%. According to FIGS. 8A-8C, the theoretical performance has a maximum divergence of 9.1% when compared to the experimental results.

Figure 9A:
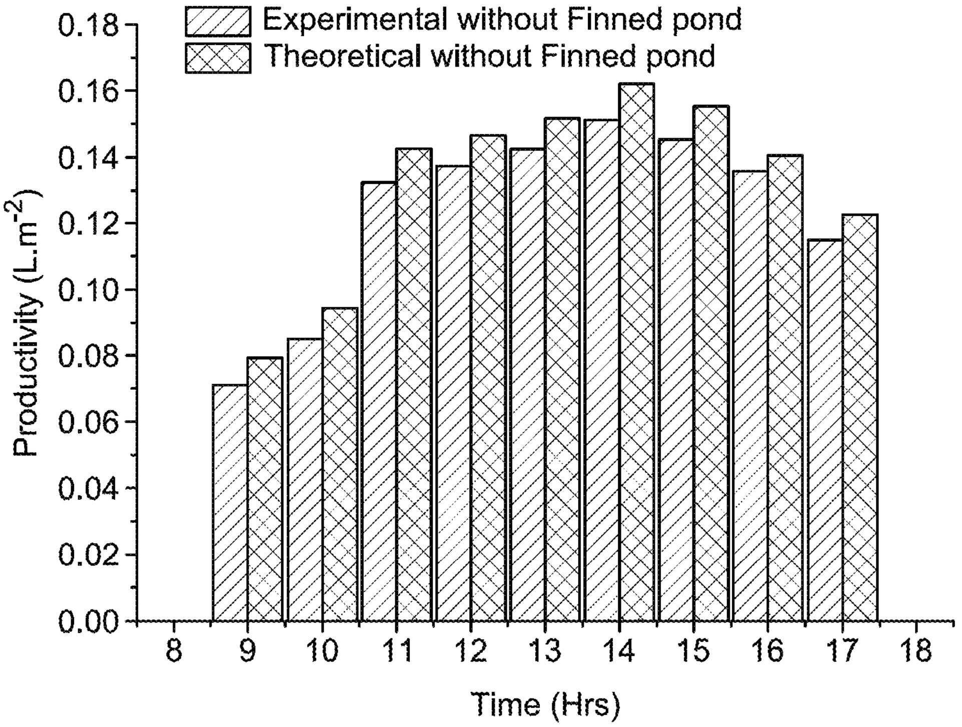
FIG. 9A is a graph depicting experimental and theoretical productivity of a solar still having a basin without fins combined with a vessel (pond) without fins, according to certain embodiments.
Figure 9B:
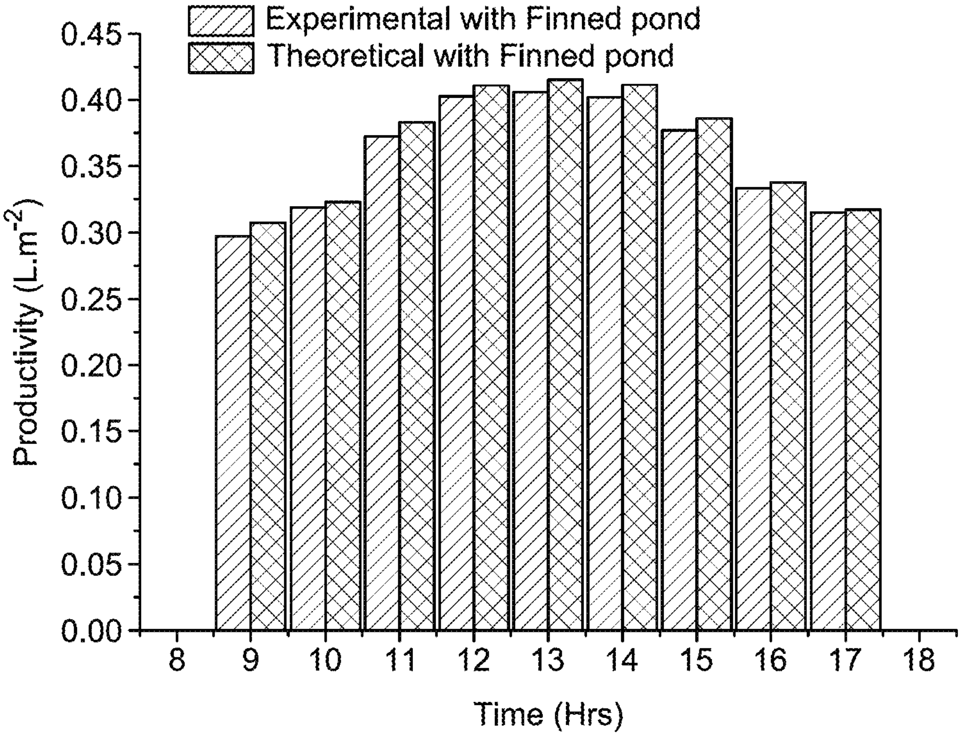
FIG. 9B is a graph depicting experimental and theoretical productivity of a solar still having a basin with fins combined with a vessel (pond) with fins, according to certain embodiments.
Figure 9C:
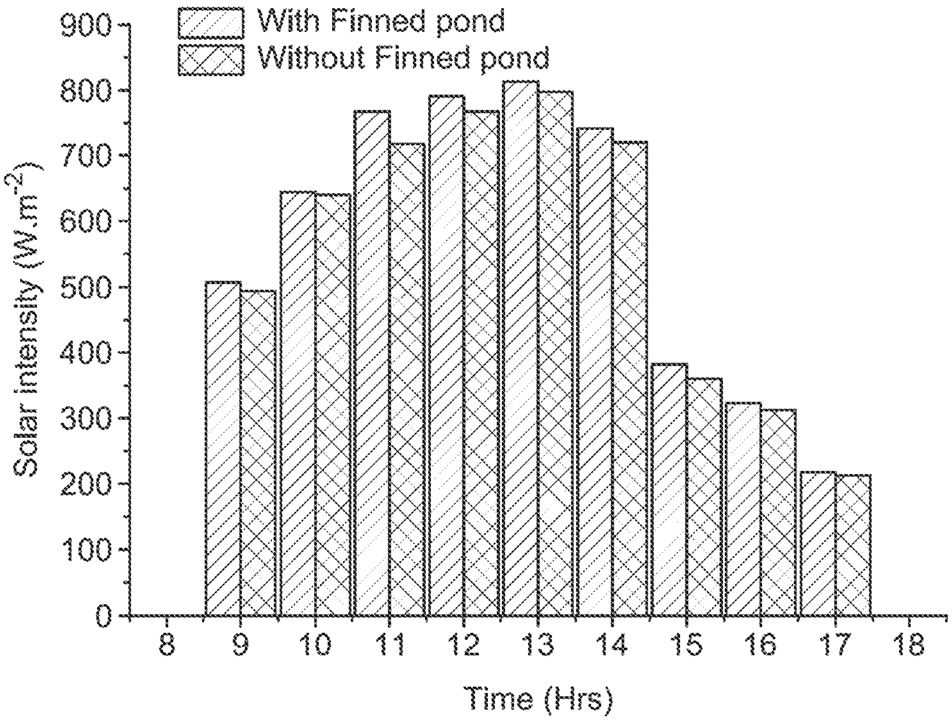
FIG. 9C is a graph depicting experimental and theoretical variations of solar intensity for a solar still having a basin combined with a vessel (pond), each with and without fins, according to certain embodiments.

It may be understood that the pond's surface area increases when fins are used in both the pond and the still. The increased surface area due to the fins at the bottom of the pond increases its ability to retain heat. FIGS. 9A-9C illustrate graphs depicting productivity of a solar still having a basin without fins combined with a vessel without fins and a solar still having a basin with fins combined with a vessel with fins, and variation of solar intensity therein. FIG. 9A shows the maximum freshwater output was observed around 0.151 $L \cdot m^{-2}$ (experimental) and 0.162 $L \cdot m^{-2}$ (theoretical) at 2 PM without a finned pond. The efficiency of solar still without fins and with ISBSS may be constrained since fin solar ponds (vessels) may produce considerable amounts of freshwater more quickly and at greater temperatures. Therefore, simple solar stills without fins and without a solar pond may have a lower daily water production than alternative setups with more advanced features. But in some circumstances, it is a practical and affordable choice for purifying water. FIG. 9B shows that the maximum freshwater output was observed around 0.404 $L \cdot m^{-2}$ (experimental) and 0.415 $L \cdot m^{-2}$ (theoretical) at 1 PM for the finned pond (vessel). When a solar still and a finned solar pond are used together, the efficacy of water filtration can be boosted. The finned solar pond ensures continuous evaporation by supplying hot water to the solar still. The solar still condenses and evaporates hot water from the solar pond's bottom layer. Since the solar still uses indirect sunlight in addition to direct sunlight to heat the water, this integration enables a more reliable and effective water purification process. Instead, even on cloudy days or during low solar radiation, it gains from the consistent supply of heated water from the finned pond. FIG. 9C shows that the maximum solar intensity with and without fins was 810 and 796 $W \cdot m^{-2}$, respectively, at 1 PM. The surface area accessible for heat absorption is increased when fins or other heat-absorbing materials are present in the solar pond's bottom layer. As a result, the solar pond is able to absorb and hold onto more solar energy, which raises the water's temperature. The enhanced heat absorption contributes to the improvement in the solar pond's overall efficiency. The temperature difference inside the solar pond increases as more solar energy is turned into heat, which warms the water. The fins help to keep the solar pond's top layer, which has low salinity, and its bottom layer, which has high salinity, at nearly constant temperatures.

Figure 10A:
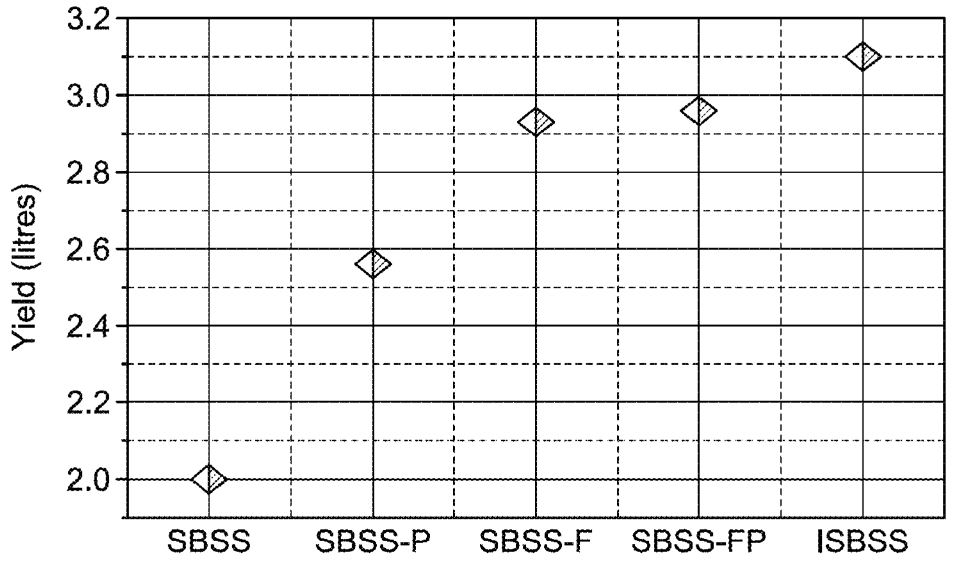
FIG. 10A is a graph depicting comparison of water yield using different variations of the solar still, according to certain embodiments.
Figure 10B:
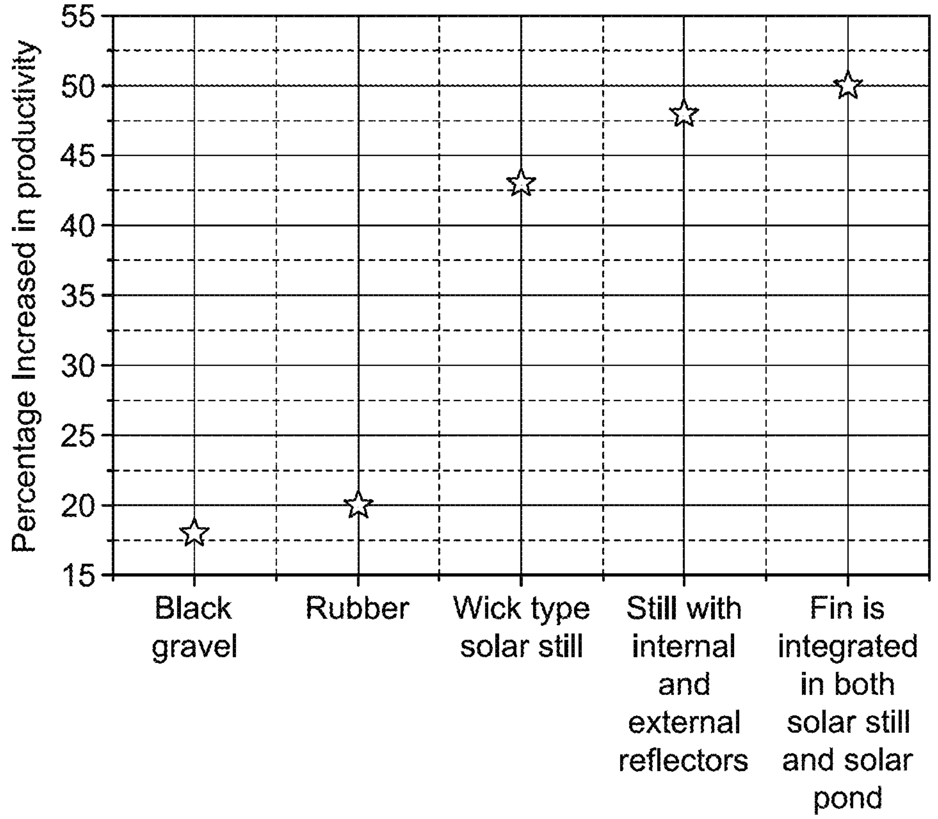
FIG. 10B is a graph depicting evaluation of productivity of the solar still using different techniques, according to certain embodiments.

FIG. 10A demonstrates the evaluation of productivity for several alterations of the solar still system, and it was determined that fins in both the still and pond bottom enhanced productivity. From FIG. 10A, the yield obtained by fin-type solar pond with still was 3.1 L/h, which is high compared to the other conventional systems. Also, FIG. 10B compares the productivity of different types of systems for various modifications. The productivity of the ISBSS was 52%.

Table 1 provides the production growth rate for each of the systems studied. A solar still and solar pond with fins increases a solar thermal energy system's output and performance. Installing ISBSS enhances the capacity for receiving energy and storing it, leading to good heat retention and fewer losses. Providing the solar still with warm water constantly improves its ability to distill and produce water. The integrated system is more dependable since it maintains constant energy production even when there is little sunlight or at night. Compared to other systems, ISBSS gives the maximum productivity.

TABLE 1

Productivity from different systems

| System | % Improvement in productivity |
|---|---|
| SBSS-F | 46 |
| SBSS-FP | 48 |
| ISBSS (SBSS-F + SBSS-FP) | 52 |

Uncertainty Analysis

The design limitations and some experimental variables are related to error. Measurement accuracy and precision are affected by factors such as instrument selection, calibration, condition, observation, environment, reading, and test design. An uncertainty analysis is done to ensure the tests are conducted properly. Table 2 provides the instruments used in this work along with their model, make, accuracy, and range of operation. It is found that the total uncertainty of the measuring instruments lies within +1.596% in this work.

$$\text{Total Uncertainty } \% = \sqrt{\text{uncertainty of Anemometer}^2} + \sqrt{\text{uncertainty of Thermocouple}^2} + \sqrt{\text{uncertainty of Beaker}^2} + \sqrt{\text{uncertainty of Solarimeter}^2} \quad (25)$$

$$\text{Total Uncertainty } \% = \sqrt{0.6^2} + \sqrt{0.7^2} + \sqrt{1.1^2} + \sqrt{0.7^2}$$

$$\text{Total Uncertainty } \% = \pm 1.596$$

TABLE 2

| Instruments model no. and spec and make | | | | |
|---|---|---|---|---|
| Instrument | Model | Make | Accuracy | Range |
| Anemometer | AVM 03 | Metrix+ | ±0.1 m/s | 0-15 m/s |
| Thermocouple | K-type | Radix | ±1° C. | 0-100° C. |
| Measuring beaker | 1 L | RS Pro | ±10 mL | 0-1,000 mL |
| Kipp-Zonen solarimeter | SP Lite2 | Kipp-Zonen | ±1 W/m$^2$ | 0-5,000 W/m$^2$ |

Changes to solar still systems were tested through outdoor experiments. The investigation analyzed the SBSS, SBSS-F, SBSS-P, SBSS-FP, and ISBSS through theoretical and experimental methods. All modifications experienced increased productivity during the peak hours. Solar radiation led to a productivity increase. The large surface area exposed to solar radiation in the still and solar pond made the ISBSS more productive. In addition, convection increased the basin-to-water heat transfer rate and increased the rate of thermal transfer from the basin to the water. Compared to conventional stills, using fins in the still and the solar pond can increase daily output by 52%. SBSS-FP and SBSS-F increased productivity by 48% and 46%, respectively.

In general, only a modest amount of distilled water can be generated each day by a basic solar still with a single basin. Fin-type solar ponds, fin-type solar stills, and integrated fin-type solar stills with finned ponds were evaluated in this disclosure. The theoretical and experimental performance of the proposed systems were carried out in Pongalur near Tirupur (10.9729° N, 77.3698° E), a region with a latitude of 10° north. Single basin solar still (SBSS), single basin solar still with fin (SBSS-F), single basin solar still with pond (SBSS-P), single basin solar still with finned pond (SBSS-FP), and integrated single basin fin-type solar still with a finned solar pond (ISBSS) were developed. Adding fins to the solar pond enhanced the thermal performance of the SBSS by increasing the daily water collection. The rate at which heat is transmitted from the basin to the water has rose with the incorporation of fins. The amount of water collected by the single basin solar still with fin, the single basin solar still with finned pond, and the integrated single basin solar still with fins and finned pond increased by 46%, 48%, and 52% for each of these systems compared to the single basin solar still.

Figure 11:
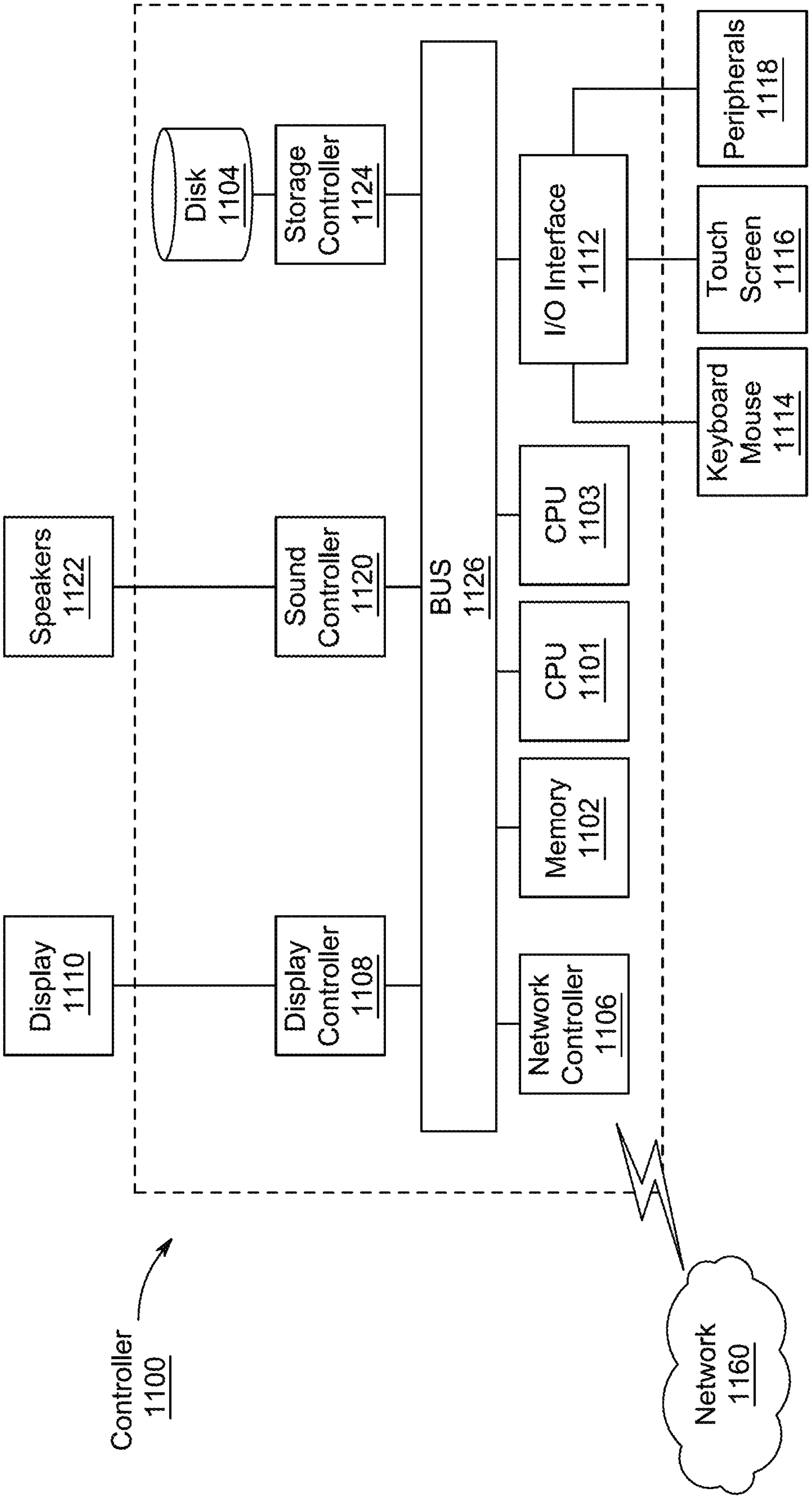
FIG. 11 is an illustration of a non-limiting example of details of computing hardware used in a computing system, according to certain embodiments.

Further details of hardware description of computing environments according to embodiments of this disclosure are described with reference to FIG. 11. In FIG. 11, a controller 1100 is described, in which the controller 1100 is a computing device which includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely. In some embodiments, a CPU 1103 may be used in combination with CPU 1103 and with one or more CPUs.

The claims are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

The claims may be provided as a utility application, background daemon, or component of an operating system, or combination thereof, executing in conjunction with CPU 1101, 1103 and an operating system such as Microsoft Windows 7, Microsoft Windows 8, Microsoft Windows 10, UNIX, Solaris, LINUX, Apple MAC-OS, and other systems known to those skilled in the art.

The hardware elements to achieve the computing device may be realized by various circuitry elements, known to those skilled in the art. For example, CPU 1101 or CPU 1103 may be a Xenon or Core processor from Intel of America or an Opteron processor from AMD of America or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G, 4G, and 5G wireless cellular systems, and any other cellular networks known in the art. The wireless network can also be WiFi, Bluetooth, or any other wireless form of communication that is known.

The computing device further includes a display controller 1108, such as a NVIDIA Geforce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 and/or a touch screen panel 1116 on/or separate from display 1110. General purpose I/O interface also connects to a variety of peripherals 1118, including printers, scanners and the like, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity, as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
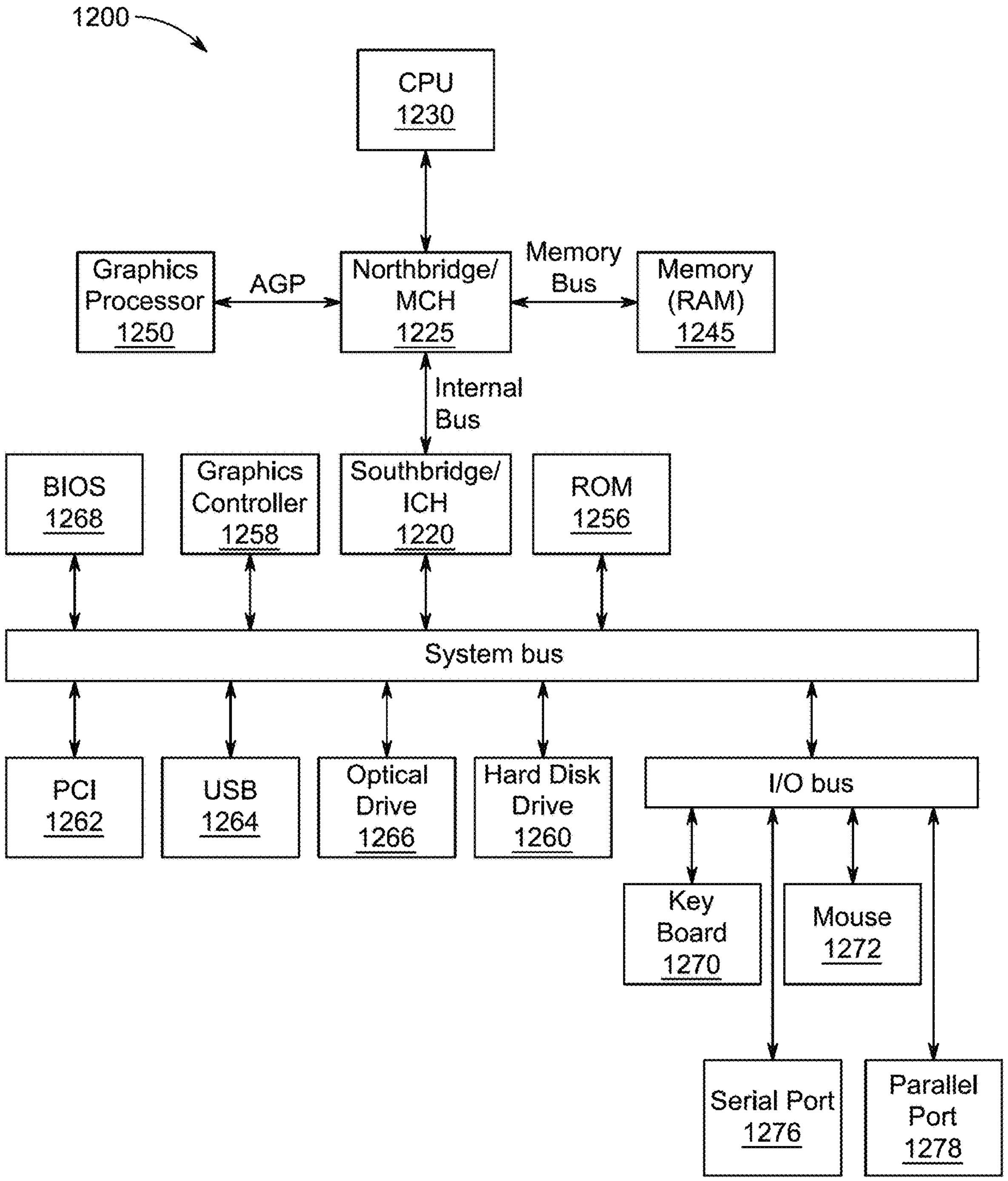
FIG. 12 is an exemplary schematic diagram of a data processing system used within the computing system, according to certain embodiments.

FIG. 12 shows a schematic diagram of a data processing system, according to certain embodiments, for performing the functions of the exemplary embodiments. The data processing system is an example of a computer in which code or instructions implementing the processes of the illustrative embodiments may be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory (RAM) 1245 via a memory bus and connects to the graphics processor 1250 via an accelerated graphics port (AGP). The NB/MCH 1225 also connects to the SB/ICH 1220 via an internal bus (e.g., a unified media interface or a direct media interface). The CPU 1230 may contain one or more processors and even may be implemented using one or more heterogeneous processor systems.

Figure 13:
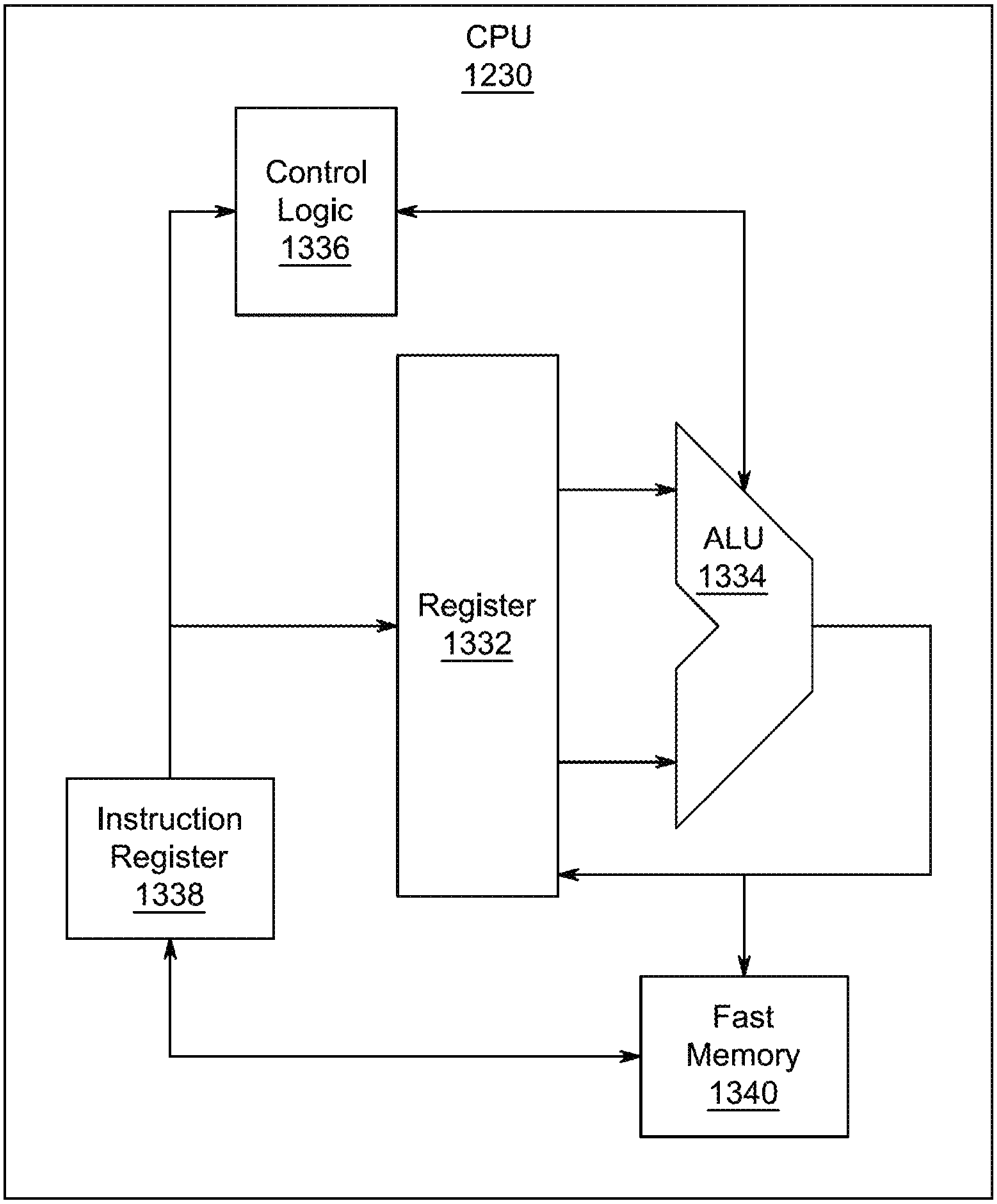
FIG. 13 is an exemplary schematic diagram of a processor used with the computing system, according to certain embodiments.

FIG. 13 shows one implementation of CPU 1230. In one implementation, the instruction register 1338 retrieves instructions from the fast memory 1340. At least part of these instructions are fetched from the instruction register 1338 by the control logic 1336 and interpreted according to the instruction set architecture of the CPU 1230. Part of the instructions can also be directed to the register 1332. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain implementations, the instruction set architecture of the CPU 1230 can use a reduced instruction set architecture, a complex instruction set architecture, a vector processor architecture, a very large instruction word architecture, a combination thereof, and the like. Furthermore, the CPU 1230 can be based on the Von Neuman model, the Harvard model, and any model known in the art. The CPU 1230 can be a digital signal processor, an FPGA, an ASIC, a PLA, a PLD, a CPLD, and the like. Further, the CPU 1230 can be an x86 processor by Intel or AMD, an ARM processor, a Power architecture processor by, IBM, a SPARC architecture processor by Sun Microsystems or Oracle, or other known CPU architecture.

Referring again to FIG. 12, the data processing system 1200 can include that the SB/ICH 1220 is coupled through a system bus to an I/O bus, a read only memory (ROM) 1256, a universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. A hard disk drive 1260 and a CD-ROM (optical drive) 1266 can use, for example, an integrated drive electronics (IDE) or a serial advanced technology attachment (SATA) interface. In one implementation the I/O bus can include a super I/O (SIO) device.

The hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bus through the I/O bus. Other peripherals and devices may be connected to the SB/ICH 1220 using a mass storage controller such as SATA or PATA, an Ethernet port, an ISA bus, a LPC bridge, SMBus, a DMA controller, an audio codec, and the like.

The present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry and/or based on the requirements of the intended back-up load to be powered.

Figure 14:
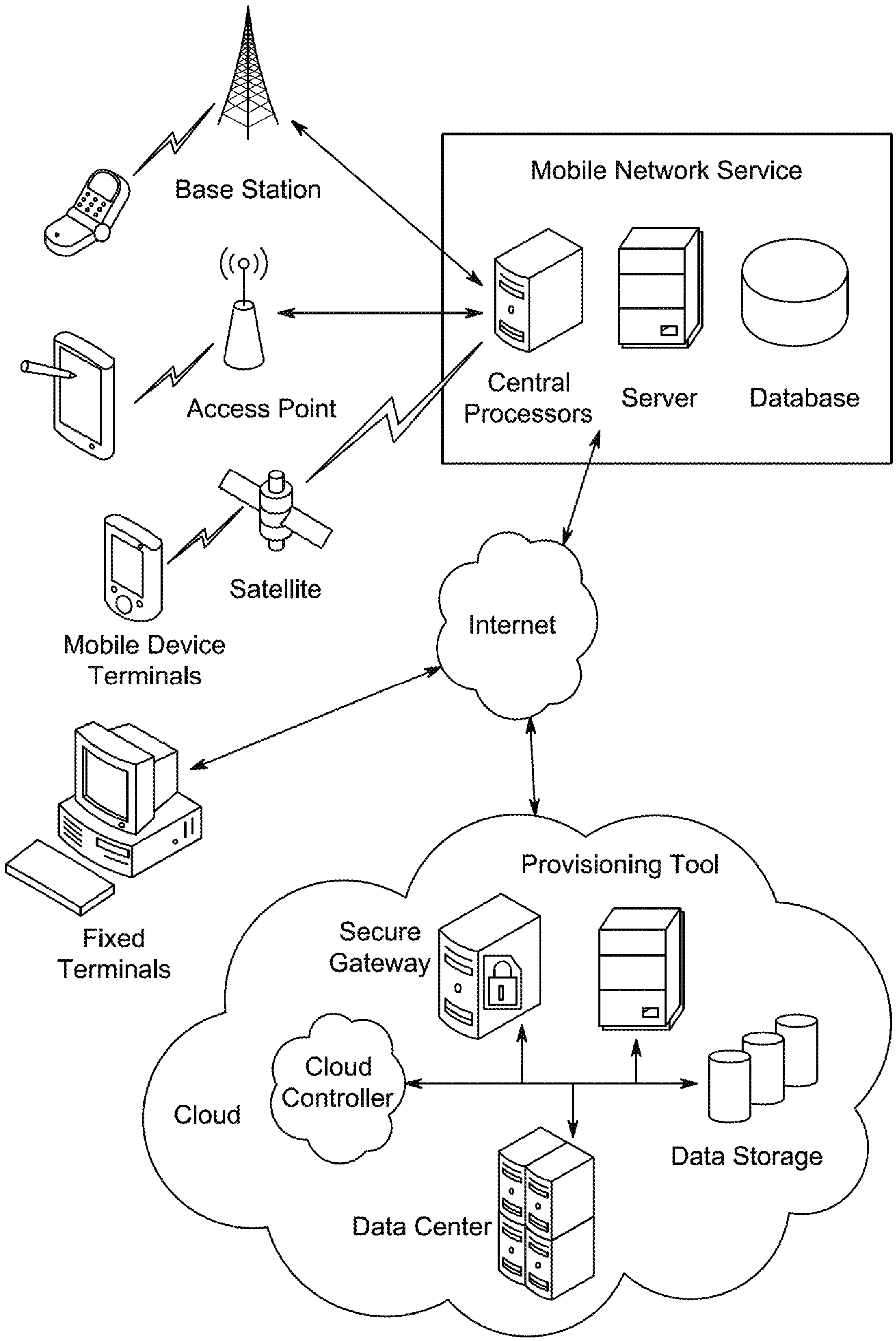
FIG. 14 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of desalination, comprising:

distilling water from an aqueous solution with a solar still system;

wherein the solar still system comprises:

a storage tank, a piping network, a basin, wherein the basin has an open top, wherein the basin has at least five fins extending vertically from a bottom surface of the basin, wherein the at least five fins are rectangular and are positioned parallel to one another and are 800 to 1000 mm in length, 30 to 40 mm in breadth, and 0.1 to 5 mm in thickness, wherein the basin is disposed in an insulated enclosure, wherein a fiber insulator fills a space between the basin and the insulated enclosure, wherein the insulated enclosure is a square with a first side having a first height and a second side having a second height, wherein the first height is shorter compared to the second height, wherein the insulated enclosure has a top surface with a transparent cover, wherein the transparent cover is attached to a top of the first side and a top of the second side, wherein the transparent cover is at an angle of 5 to 20°, wherein a collection tray is attached to an inner face of the first side under the transparent cover, wherein a glass stopper is attached to the transparent cover over the collection tray, wherein the insulated enclosure is covered in one or more metal sheets, a vessel having an open top, wherein the vessel having an open top has a lower convective zone, a non-convective zone, and an upper convective zone, wherein the vessel having an open top has a conical shape with a top surface and a bottom surface, wherein the vessel having an open top has at least four fins extending vertically from the bottom surface of the vessel having an open top, wherein the at least four fins are rectangular and are positioned parallel to one another and are 100 to 300 mm in length, 30 to 70 mm in breadth, and 0.1 to 5 mm in thickness, wherein a surface area of the top surface of the vessel having an open top is greater than a surface area of the bottom surface of the vessel having an open top, wherein the piping network fluidly connects, in the following order, the storage tank with the vessel having an open top and the vessel having an open top with the basin, wherein the aqueous solution comprises one or more salts, wherein the distilling includes flowing the aqueous solution from the storage tank to the vessel having an open top and from the vessel having an open top to the basin, exposing the aqueous solution in the basin to sunlight;

evaporating water from the aqueous solution in the basin to form evaporated water;

condensing the evaporated water on the transparent cover; and collecting condensed water in the collection tray, wherein water obtained by the distilling from the solar still system is increased 50 to 55 percent by volume in comparison to the same solar still system in the absence of fins, wherein the solar still system has a productivity rate of 2 to 4 L/h, and wherein the solar still system has a freshwater output 0.35 to 0.45 L/m$^2$ at a solar intensity of 790 to 830 W/m$^2$.

2. The method of claim 1, wherein water obtained by the distilling from the solar still system is increased 51 to 54 percent by volume in comparison to the same solar still system in the absence of fins at a solar intensity of 790 to 830 W/m$^2$.

3. The method of claim 1, wherein the solar still system has a productivity rate of 2.5 to 3.5 L/h at a solar intensity of 790 to 830 W/m$^2$.

4. The method of claim 1, wherein the solar still system has a freshwater output 0.375 to 0.425 L/m$^2$ at a solar intensity of 790 to 830 W/m$^2$.

5. The method of claim 1, wherein the basin has a depth of 0.05 to 0.25 meters and a length of 0.5 to 2 meters.

6. The method of claim 1, wherein the basin is a galvanized iron material.

7. The method of claim 6, wherein the galvanized iron has a thickness of 1 to 5 mm.

8. The method of claim 1, wherein the at least five fins extending vertically from the bottom surface of the basin are positioned 0.1 to 0.2 m from each other.

9. The method of claim 1, wherein the fiber insulator is sawdust.

10. The method of claim 1, wherein the space between the basin and the insulated enclosure is 0.05 to 0.5 m thick.

11. The method of claim 1, wherein the transparent cover has a thickness of 1 to 10 mm.

12. The method of claim 1, wherein the at least four fins extending vertically from the bottom surface of the vessel having an open top are positioned 0.005 to 0.1 m from each other.

13. The method of claim 1, wherein the top surface of the vessel having an open top has a diameter of 0.6 to 1.2 m.

14. The method of claim 1, wherein the bottom surface of the vessel having an open top has a diameter of 0.1 to 0.5 m.

15. The method of claim 1, wherein the vessel having an open top has a height of 0.5 to 2.0 m.

16. The method of claim 1, wherein the lower convective zone has a greater salinity than the non-convective zone and the non-convective zone has a great salinity than the upper convective zone in the vessel having an open top.

17. The method of claim 1, wherein the piping network fluidly connects the upper convective zone of the vessel having an open top with the basin.

18. The method of claim 1, wherein the solar still system further comprises:

a first flow control valve between the storage tank and the vessel having an open top; and a second flow control valve between the vessel having an open top and the basin.

19. The method of claim 1, wherein the solar still system further comprises:

a collection tank, wherein the collection tray is fluidly connected to the collection tank by the piping network.

* * * * *